US006956969B2

(12) United States Patent
Loudon et al.

(10) Patent No.: US 6,956,969 B2
(45) Date of Patent: Oct. 18, 2005

(54) METHODS AND APPARATUSES FOR HANDWRITING RECOGNITION

(75) Inventors: Gareth H. Loudon, Singapore (SG); Yi-Min Wu, Singapore (SG); James A. Pittman, Lake Oswego, OR (US)

(73) Assignees: Apple Computer, Inc., Cupertino, CA (US); Institute of Systems Science, National University of Singapore, Kent Ridge (SG)

( * ) Notice: Subject to any disclaimer, the term of this patent is extended or adjusted under 35 U.S.C. 154(b) by 136 days.

(21) Appl. No.: 10/408,895

(22) Filed: Apr. 7, 2003

(65) Prior Publication Data

US 2003/0190074 A1 Oct. 9, 2003

Related U.S. Application Data

(62) Division of application No. 08/652,160, filed on May 23, 1996, now Pat. No. 6,556,712.

(51) Int. Cl.[7] .................................................. G06K 9/00
(52) U.S. Cl. ...................................... 382/185; 382/187
(58) Field of Search ................................ 382/187, 189, 382/217, 218, 185, 186

(56) References Cited

U.S. PATENT DOCUMENTS

| 5,142,589 A | * | 8/1992 | Lougheed et al. | 382/102 |
|---|---|---|---|---|
| 5,295,238 A | * | 3/1994 | Dickson | 345/471 |
| 5,459,809 A | * | 10/1995 | Kim et al. | 382/160 |
| 5,559,897 A | * | 9/1996 | Brown et al. | 382/186 |
| 5,594,810 A | * | 1/1997 | Gourdol | 382/187 |
| 5,675,665 A | | 10/1997 | Lyon | 382/229 |
| 5,687,254 A | * | 11/1997 | Poon et al. | 382/187 |
| 5,878,164 A | * | 3/1999 | Brown et al. | 382/190 |

OTHER PUBLICATIONS

Yoshida et al. "Online Handwritten Character Recognition for a Personal Computer System." IEEE Transactions on Consumer Electronics, vol. CE–28, No. 3, pp. 202–209, Aug. 1992.*

Jeng et al. "Optical Chinese Character Recognition With a Hidden Markov Model Classifier—A Novel Approach." Electronics Letters, vol. 26, No. 18, Aug. 30, 1990, pp. 1530–1531.*

Bose et al. "Connected and Degraded Text Recognition Using Hidden Markov Model." Proc. 11th Int. Conf. on Pattern Recognition, vol. II, Conf. B: Pattern Recognition Methodology and Systems, Aug. 30, 1992, pp. 116–119.*

Chen et al. "Word Spotting in Scanned Images Using Hidden Markov Models." IEEE Int. Conf. on Acoustics, Speech and Signal Processing, vol. 5, Apr. 27, 1993, pp. 1–4.*

Chen et al. "Handwritten Word Recognition Using Continuous Density Variable Duration Hidden Markov Model." IEEE Int. Conf. on Acoustics, Speech and Signal Processing, vol. 5, Apr. 27, 1993, pp. 105–108.*

(Continued)

*Primary Examiner*—Jon Chang
(74) *Attorney, Agent, or Firm*—Blakely, Sokoloff, Taylor & Zafman LLP

(57) ABSTRACT

Method and apparatus for handwriting recognition system for ideographic characters and other characters based on subcharacter hidden Markov models. The ideographic characters are modeled using a sequence of subcharacter models and by using two-dimensional geometric layout models of the subcharacters. The subcharacter hidden Markov models are created according to one embodiment by following a set of design rules. The combination of the sequence and geometric layout of the subcharacter models is used to recognize the handwriting character.

39 Claims, 16 Drawing Sheets

OTHER PUBLICATIONS

Wang et al. "Optical Recognition of Handwritten Chinese Characters by Partial Matching." Proc. $2^{nd}$ Int. Conf. on Document Analysis and Recognition, Oct. 20, 1993, pp. 822–825.*

Bellegarda et al. "A Discrete Parameter HMM Approach to On–Line Handwriting Recognition." Int. Conf. on Acoustics, Speech and Signal Processing, vol. 4, May 9, 1995, pp. 2631–2634.*

K. Lee "Automatic Speech Recognition; The Development of The SPHINX Systems",Kluwer, Boston, 1989.

Nag, R., et al. "Script Recognition Using Hidden Markow Models", Proceedings of the International Conference on Acoustics, Speech and Signal Processing, pp. 2071–2074, 1986.

Jeng, B., et al., "On The Use Of Discrete–state Markov Process for Chinese Character Recognition", SPIE, vol. 1360, Visual Comm. and Image Processing'90, pp. 1663–1670, 1990.

Ng, T.M. and Low, H.B., "Semiautomatic Decomposition and Partial Ordering of Chinese Radicals", Proceedings of the Int. Conf. on Chinese Computing, pp. 250–254, 1988.

Mori et al., "Research on Machine Recognition of Handprinted Characters". IEEE Transactions on Pattern Analysis and Machine Intelligence, vol. 6, No. 4, pp. 386–405, 1984.

Tappert, C.C., et al., "The State of The Art In On–Line Handwriting Recognition". IEEE Transactions on Pattern Analysis and Machine Intelligence, ol. 12, No. 8, pp. 787–808, 1990.

L.E. Baum, "Inequality and Associated Maximization Technique In Statistical Estimation of Probabilistic Functions of Markov processes", Inequalities, vol. 3, pp. 1–8, 1972.

Sato, Y., and K. Kogure, "Online Signature Verification Based on Shape, Motion, and Writing Pressure", Proceedings, 6th International Converence of Pattern Rec. vol. 6 pp. 823–826, 1982.

Parizeau and Plamondon, Allograph Adjacency Constraints for Cursive Script REconition, Pre–Proceedings IWFHR III, 1993, 252–61.

PCT/US97/08796 International Search Report.

Y.S. Haung and C.Y. Suen. "An Optimal Method of Combining Multiple Classifiers for Unconstrained Handwritten Numeral Recognition". Proceedings of the Third International Workshop on Frontiers in Handwriting Recognition. USA pp. 11–20, 1993.

* cited by examiner

METHODS AND APPARATUSES FOR HANDWRITING RECOGNITION

This application is a divisional application of U.S. patent application Ser. No. 08/652,160, which was filed on May 23, 1996, now U.S. Pat. No. 6,556,712.

FIELD OF THE INVENTION

The present invention relates to the field of handwriting recognition systems and methods for handwriting recognition. More particularly, in one implementation, the present invention relates to recognition of on-line cursive handwriting for ideographic scripts.

BACKGROUND OF THE INVENTION

The Chinese and Japanese languages use ideographic scripts, where there are several thousand characters. This large number of characters makes the entry by a typical computer keyboard of a character into a computer system cumbersome and slow. A more natural way of entering ideographic characters into a computer system would be to use handwriting recognition, and particularly automatic recognition of cursive style handwriting in a "on-line" manner. However, prior on-line handwriting recognition methods have concentrated on print style handwritten ideographic characters; the requirement that the handwriting be printed is still too slow for a typical user of a computer system. These prior methods have not been successful at adapting to on-line cursive style handwriting character recognition.

The complexity of the ideographic characters and the character distortion due to non-linear shifting and multiple styles of writing also makes character recognition difficult, particularly for on-line systems.

One method which has been used extensively to deal with the types of problems arising from ideographic character recognition is hidden Markov modeling (HMM). HMMs can deal with the problems of segmentation, nonlinear shifting and multiple representation of patterns and have been used extensively in speech and more recently character recognition. See, for example, K. Lee "Automatic Speech Recognition; The Development of The SPHINX System", Kluwer, Boston, 1989.; Nag, R., et al. "Script Recognition Using Hidden Markov Models", Proceedings of the International Conference on Acoustics, Speech and Signal Processing, pp. 2071–2074, 1986; and Jeng, B., et al., "On The Use Of Discrete State Markov Process for Chinese Character Recognition", SPIE, vol. 1360, Visual Communications and Image Processing '90, pp. 1663–1670, (1990). Jeng used HMMs for off-line recognition of printed Chinese characters. In this system described by Jeng, one HMM is used for every Chinese character, and the HMMs are of fixed topology. The limitations of this approach are that the system can only recognize printed Chinese characters and not cursively written characters. This recognition system also requires a large amount of memory to store the thousands of character level Markov models. Another disadvantage of the system is that a fixed topology is used for every character and the number of states for a character's hidden Markov model does not depend on the complexity of the character.

In ideographic languages, such as Chinese, the thousands of ideographic characters can be broken down into a smaller set of a few hundred subcharacters (also referred to as radicals). There are several well know dictionaries which define recognized radicals in the various ideographic languages. Thus, the thousands of ideographic characters may be represented by a smaller subset of the subcharacters or radicals. See, Ng, T. M. and Low, H. B., "Semiautomatic Decomposition and Partial Ordering of Chinese Radicals", Proceedings of the International Conference on Chinese Computeing, pp. 250–254 (1988). Ng and Low designed a semiautomatic method for defining Chinese radicals. However, these radicals are not suitable for on-line handwriting character recognition using hidden Markov models for several reasons. First, to perform on-line character recognition using radical HMMs, a character model based on several radical HMMs should be formed from a time sequence of subcharacters, which was not done by Ng and Low. Secondly, Ng and Low break down the characters into four basic constructs or categories of radicals; vertical division; horizontal division; encapsulation and superimposition, and a radical as defined by Ng and Low can appear in more than one of these categories. This has the effect of having up to four different shapes and sizes for the radical and this will have a detrimental effect on the hidden Markov modeling accuracy because the model has to deal with up to four different basic patterns for the four categories.

While the use of subcharacters or radicals to recognize ideographic characters is in some ways desirable, it does not always accurately recognize characters without also recognizing the geometric layout of the subcharacters relative to each other in a character. In a prior approach by Lyon, the use of a size and placement model for subcharacters in a ideographic script has been suggested. See, U.S. patent application Ser. No. 08/315,886, filed Sep. 30, 1994 by Richard F. Lyon, entitled "System and Method for Word Recognition Using Size and Placement Models." This method uses the relationship between sequential pairs of subcharacters in a character to create a size and placement model. The subcharacter pair models are created by finding the covariance between bounding box features of subcharacter pairs. This method relies on the pen lift which occurs between subcharacters of ideographic characters and thus is only useful for printed ideographic characters and cannot be used for cursively written ideographic characters where there is usually no pen lift between characters.

Thus the prior art while providing certain benefits for handwriting recognition does not efficiently recognize cursively written ideographic characters in an on-line manner (for example, in an interactive manner). Moreover, the use of an HMM for a radical having various categories has a detrimental effect upon the accuracy of the HMM procedures. Thus it is desirable to provide improved on-line recognition of cursive handwriting for ideographic scripts.

SUMMARY OF THE INVENTION

The present invention, in one embodiment, creates an on-line handwriting recognition system for ideographic characters based on subcharacter hidden Markov models (HMMs) that can successfully recognize cursive and print style handwriting. The ideographic characters are modeled using a sequence of subcharacter models (HMMs) and they are also modeled by using the two dimensional geometric layout of the subcharacters within a character. The system includes, in one embodiment, both recognition of radical sequence and recognition of geometric layout of radicals within a character. The subcharacter HMMs are created by following a set of design rules. The combination of the sequence recognition and the geometric layout recognition of the subcharacter models is used to recognize the handwritten character. Various embodiments of the present invention are described below.

In one embodiment of the present invention, a method of recognizing a handwritten character includes the steps of comparing a handwritten input to a first model of a first portion of the handwritten character and comparing the handwritten input to a second model of a second portion of the character, where the second portion of the character has been defined in a model to follow in time the first portion. In a typical embodiment, the first model is a first hidden Markov model and the second model is a second hidden Markov model where the second model is defined to follow the first model in time; typically the first model is processed (e.g. by a Viterbi algorithm) in the system before the second model such that the system can automatically segment the first portion of the character from the second portion of the character, which is useful in the geometric layout recognition of the present invention. In a typical example, the first portion will include a first portion of a recognized radical and the second portion will include a second portion of the same recognized radical, where the first portion is normally written first and then at least another portion of another recognized radical is written and then finally the second portion is written. In this manner, the radical HMMs are separated and ordered to preserve the time sequence of the manner in which the radicals are written. It will be appreciated that the number of radicals per character vary from one to many (e.g. up to 10 radicals per character).

According to another aspect of the present invention, a method of the present invention for recognizing a handwritten character includes the steps of comparing a first geometric feature of a first portion of a character to be recognized to a first geometric model of the first portion, and comparing a second geometric feature of a second portion of a character to a first geometric model of the first portion. In a typical embodiment, this process of recognizing the layout of the radicals of a character is performed in conjunction with the recognition of the time sequence of the radicals of the character. Typically, the recognition of the time sequence of radicals provides the segmentation of the handwritten character by use of a Viterbi search through a lexical tree of hidden Markov models, which include models of the first and second radicals. This segmentation allows the layout recognition system to selectively obtain a geometric feature of a first portion of a character which is then used to compare to a geometric model of the first portion as well as other portions of geometrically trained and modeled radicals in the system.

The present invention comprises various methods and systems for defining the databases and dictionaries which are used in the handwriting recognition processes of the present invention. According to one aspect of the present invention, a method of creating a database of radicals for use in a handwriting recognition procedure is provided. This method includes storing a first model in a computer readable storage medium for a first portion of the character to be recognized, and storing a second model in the computer readable storage medium for a second portion of the character, wherein the first portion comprises a first portion of a recognized radical and a second portion comprises a second portion of the same recognized radical, where the first portion is normally written first and then at least another portion of another recognized radical is written and finally the second portion is written. While this increases the storage requirements for storing the radicals because several radicals may be created from a single recognized radical, recognition of radical sequence is now permissible according to the present invention.

According to another method of the present invention for creating a database of radicals for use in handwriting recognition, a method includes the steps of storing the first model in a computer readable storage medium for a first recognized radical and storing a second model in a computer readable storage medium for the first recognized radical, where the first recognized radical has different shapes depending on the use of the first recognized radical in a category (e.g. horizontal division or vertical division). While this method increases the storage requirements of a database according to the present invention, it does improve the accuracy of the HMM techniques used according to the present invention.

Various systems are also described in accordance with the present invention. In a typical example, a system of the present invention includes a handwriting input tablet for inputting handwritten characters. This tablet is typically coupled to a bus which receives the input of the handwritten character from the tablet. Typically, a processor is coupled to his bus and a memory is also coupled to this bus. The memory stores the various databases and computer programs described according to the present invention. In a typical embodiment, the memory stores a first model of a first portion of a character to be recognized and stores a second model of a second portion of the character, where the memory stores the second model such that the second model is defined to follow in time the first model. Typically, the processor will perform the recognition procedures through a lexical tree of HMMs stored in the memory using a Viterbi algorithm and will perform the recognition on the first model before proceeding to the hidden Markov states of the second model.

Various systems of the present invention may be implemented, including a system in auxiliary hardware which may reside in a printed circuit board card in an expansion slot of a computer system. Alternatively, the present invention may be practiced substantially in software by storing the necessary databases, data and computer programs in a general purpose memory and/or computer readable media (e.g. hard disk) which is a main memory of a computer system. This main memory is coupled to a processor which is the main processor of the computer system so that the processor may execute the computer programs stored in the memory in order to operate on the data and the databases stored in the memory to perform in the handwriting character recognition according to the present invention.

The present invention also includes computer readable storage media (e.g. a hard disk, optical disk, etc.) which store executable computer programs and data which are used to perform the handwriting recognition processes according to the present invention. This storage media typically loads (through control of the processor) a system memory (e.g. DRAM) with the computer programs and databases which are used for the handwriting recognition.

BRIEF DESCRIPTION OF THE DRAWINGS

The present invention is illustrated by way of example and not limitation in the figures of the accompanying drawings, in which like references indicate similar elements.

DETAILED DESCRIPTION OF THE INVENTION

Figure 1A:
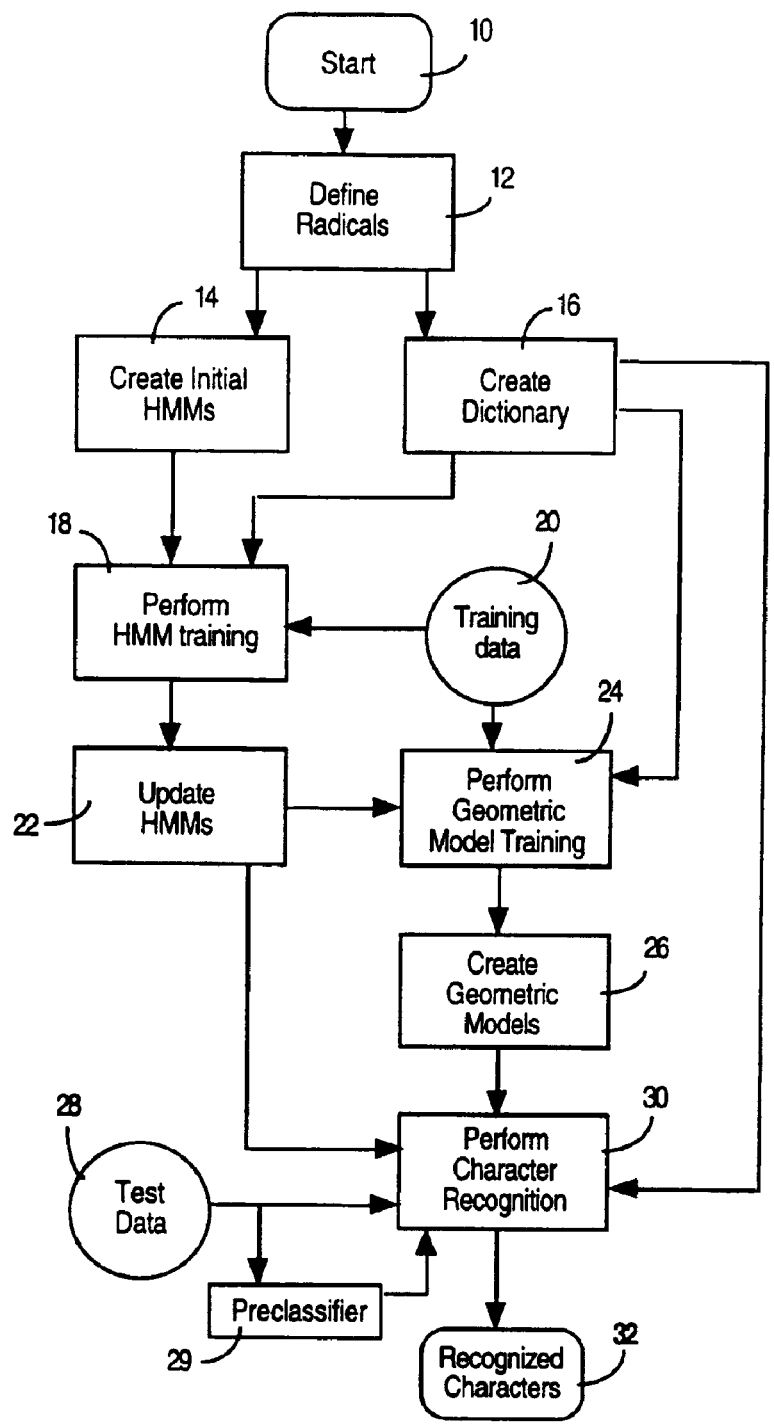
FIG. 1A is flowchart showing the overall methods of the present invention and how the different processes are used for training and recognition and how they are interrelated and interconnected.

FIG. 1A provides an overview of the present invention and its various related parts. These parts include a design procedure for creating the subcharacter models; a method that uses the subcharacter models to find the most likely sequences of subcharacters in a handwritten character; a method that uses a two-dimensional geometric layout of the subcharacter in a character to find the most likely subcharacter layout; and finally the combination of the results from the recognition of sequences of subcharacters and the recognition of the layout of the subcharacters in order to achieve character recognition. Also, as shown in FIG. 1A, the results of a conventional preclassifier are used in combination with the radical sequence recognition and the geometric layout recognition in order to achieve better accuracy and speed of recognition of handwritten characters.

Figure 15:
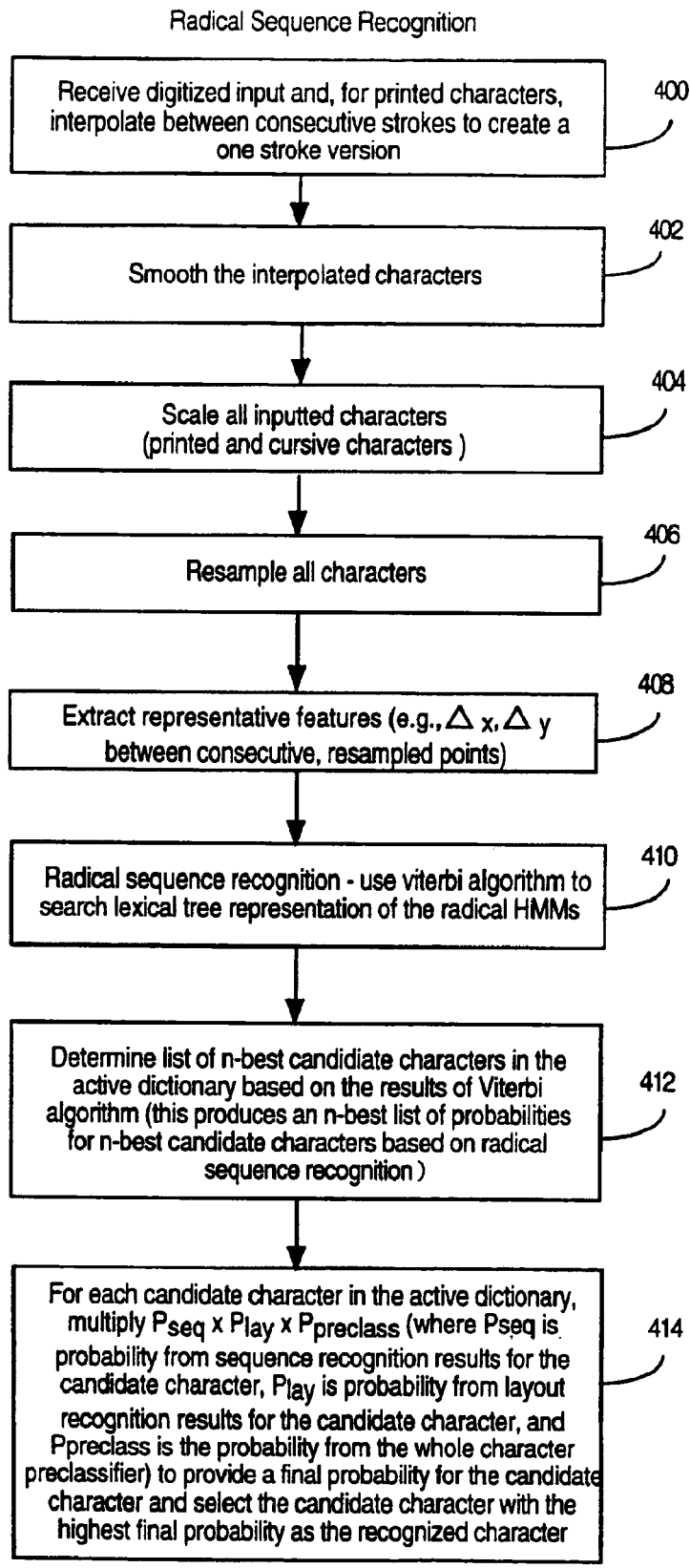
FIG. 15 shows a flowchart which illustrates a method for radical sequence recognition according to the present invention.
Figure 16:
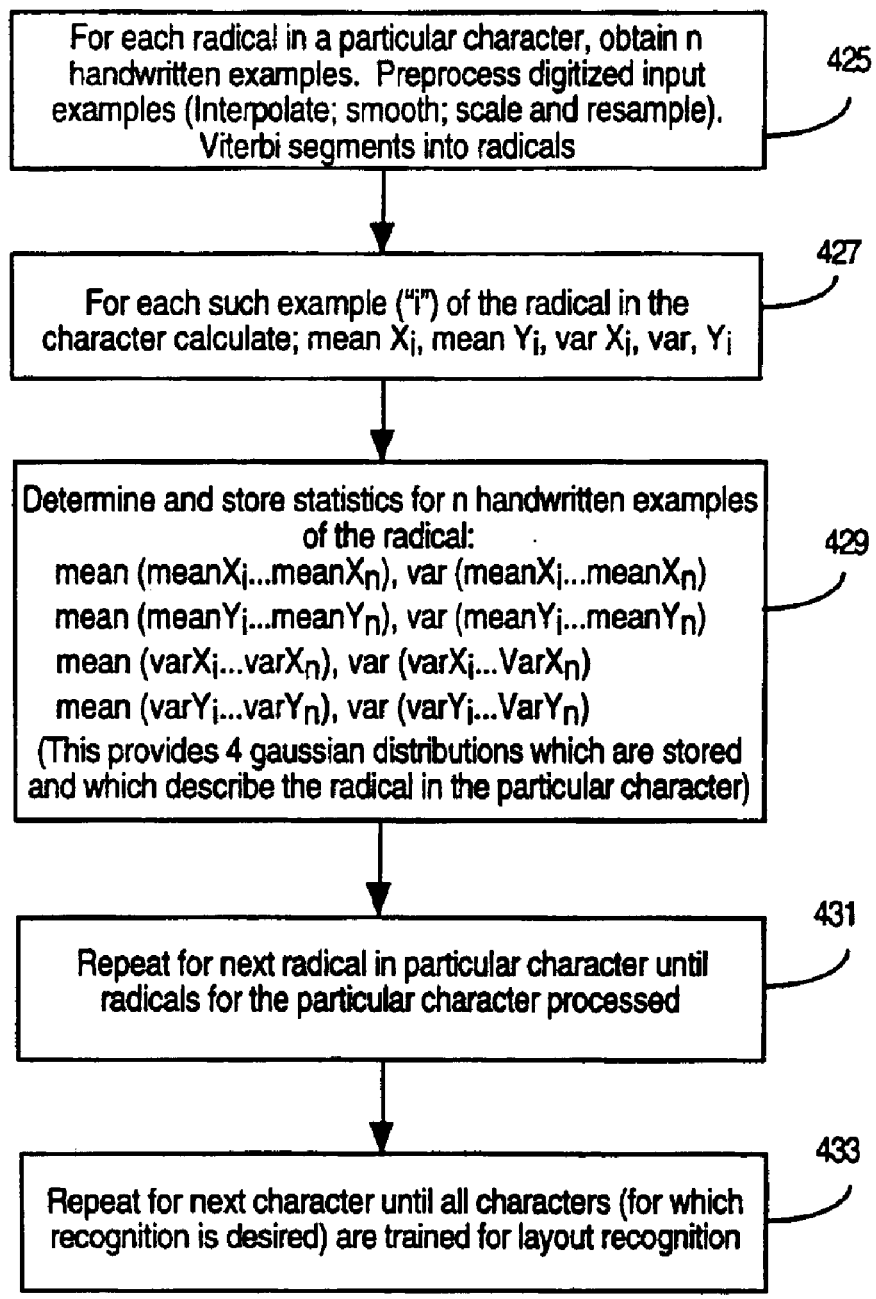
FIG. 16 shows a flowchart which illustrates a geometric layout training method according to the present invention.
Figure 18:
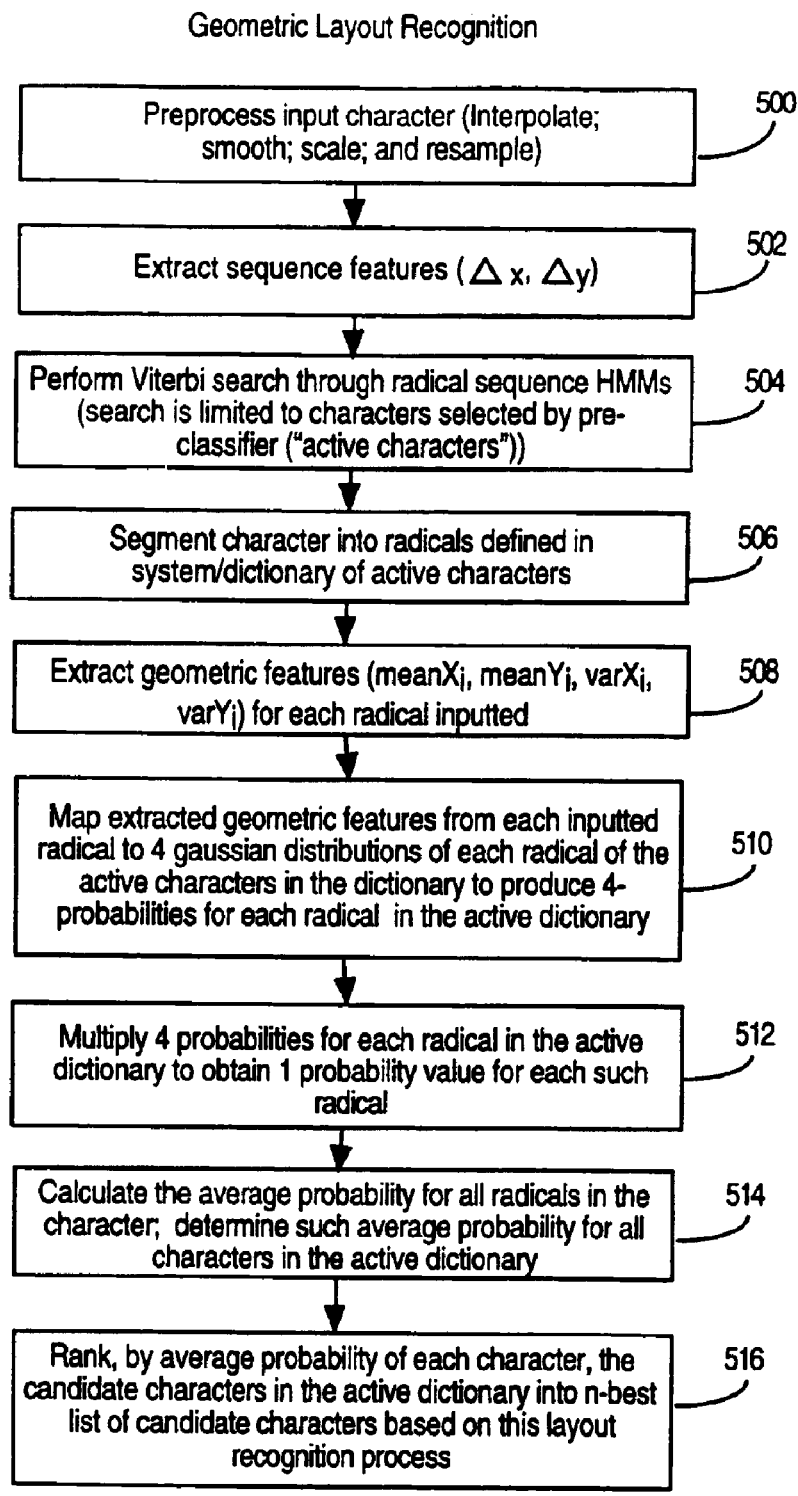
FIG. 18 illustrates a geometric layout recognition method according to the present invention.

The overall method shown in FIG. 1A begins with the definition of radicals in step 12. This step is further described in conjunction with FIGS. 5, 6A, 6B, 7, 8, and 9. The radicals are defined according to various rules described below in order to allow for the recognition of the time sequence of subcharacters and also in order to improve the accuracy of hidden Markov modeling in order to deal with different shape categories. In step 14 of FIG. 1A, the initial HMMs are created using conventional procedures, where the HMMs are defined for each radical as defined according to the procedures associated with step 12. Also, a dictionary of radicals is created in step 16; this dictionary defines the various radicals in the system, including those newly defined radicals which have been defined according to the methods of the present invention. Certain training data, preferably from the user of the computer system or digital processing system who will be providing the normal handwritten input is provided to the system in order to perform HMM training according to step 18 and to perform geometric model training according to step 24 as shown in FIG. 1A. The training of the HMMs in step 18 of FIG. 1A is performed using conventional techniques using the newly defined radicals according to the present invention. The geometric model training shown in step 24 is performed according to the method shown in FIG. 16 and described in conjunction with that figure and several other figures. The trained HMMs are provided in step 22 and these may be used to further train the geometric model training in order to improve the segmentation between radicals which is described below; this segmentation is used in order to properly segment between radicals of subcharacters in order to perform geometric model training for each radical in a character. After the geometric models have been trained for each radical, the geometric models are created in step 26 as indicated in FIG. 16. At this point, the system is ready to perform character recognition using the three different types of recognizers which are used in one embodiment of the present invention. It will be appreciated that other embodiments of the present invention may merely use the radical sequence recognition and the layout recognition without the preclassifier techniques. It will be appreciated that these preclassifier techniques and methods are conventional and have been described by numerous investigators in the field, including Y. S. Huang and C. Y. Suen in 1993. The performance of character recognition as indicated in step 30 of FIG. 1A is generally shown in FIGS. 15 and 18 and is generally described in the accompanying text for these figures.

The preclassification recognition is implemented by preclassifier 29 which receives the test data 28; the test data is provided to the radical sequence recognition and to the geometric layout recognition systems and methods of the present invention. The preclassification stage finds a small subset of candidate characters (for example, approximately 200 characters) from the full character set . This concept of preclassification is taken from the work by Y. S. Huang and C. Y. Suen, "An Optimal Method of Combining Multiple Classifiers For Unconstrained Handwritten Numeral Recognition", Proceedings of the Third International Workshop on Frontiers in Handwriting Recognition, USA, pp. 11–20, 1993; this work combines multiple classifiers for recognition. It is assumed that each classifier provides independent information for recognition. These classifiers themselves are based on standard character recognition methods; for example see Mori et al., "Research on Machine Recognition of Handprinted Characters". IEEE Transactions on Pattern Analysis and Machine Intelligence, vol. 6, no. 4, pp. 386–405 (1984); and Tappert, C. C., et al., "The State of The Art In On-Line Handwriting Recognition", IEEE Transactions on Pattern Analysis and Machine Intelligence, vol. 12, no. 8, pp. 787–808, (1990). The combined probabilities from the multiple classifiers of the preclassifier are used to rank the candidate dictionary characters. The n most probable candidate dictionary characters (e.g. n is approximately 200 in one embodiment) are passed to the radical sequence recognition and geometry layout recognition stages as described below. The characters so selected by the preclassifier as the n most probable characters (candidate characters) maybe considered the active characters in the dictionary (also referred to as the active portion of the dictionary or the active characters).

Figure 1B:
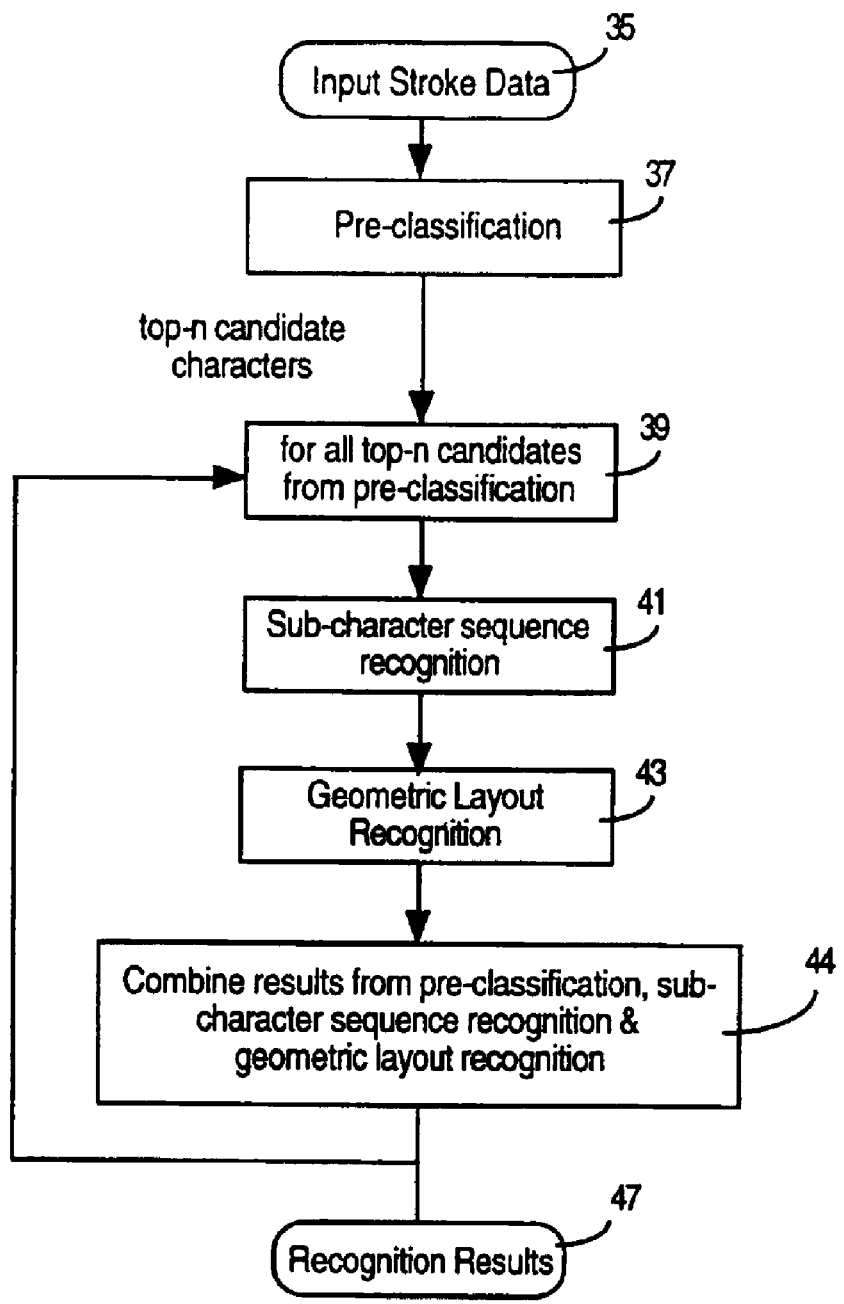
FIG. 1B illustrates in further detail the methods and steps of the recognition procedures of the present invention and the interrelationship between those procedures.

Further details of the interrelationship between the various recognition procedures according to the present invention are shown in FIG. 1B. The input stroke data 35 is passed to the preclassification system in step 37 in which the top n best candidate characters are selected according to whole character recognition (preclassification) methods which are well know in the art. For each top n candidates from the preclassification process, a subcharacter sequence recognition operation 41 and geometric layout recognition operation 43 are performed to obtain a probability for the particular candidate character from these two recognition procedures. The results of the preclassification probability and the subcharacters sequence recognition probability and the geometric layout recognition probability are combined in step 44 to provide the particular recognition result for that particular character. The system then cycles back to the next candidate character in the top n candidate list and continues to proceed through steps 39, 41, 43 and 44 until all of the top n candidates have been processed. At that point, there exists a list of a probabilities for each of the n candidates, and the best candidate is selected by selecting the candidate character having the highest probability.

The present invention may be implemented in various systems, including general purpose computer systems having little if any hardware dedicated for the purpose of handwriting recognition, systems having substantially entirely dedicated hardware, and systems having a mixture of software and dedicated hardware in order to perform the operations of the present inventions. Moreover, a mix of such systems may be used in order to implement the present invention; for example, a general purpose computer may be utilized for certain operations of the present invention while a printed circuit board housing, such as a card, may be used to provide additional processing capabilities as well as to receive the input data from an input tablet and to digitize data and perform handwritten preprocessing and other operations in conjunction with processing operations performed by the main processor of the computer system.

Figure 2:
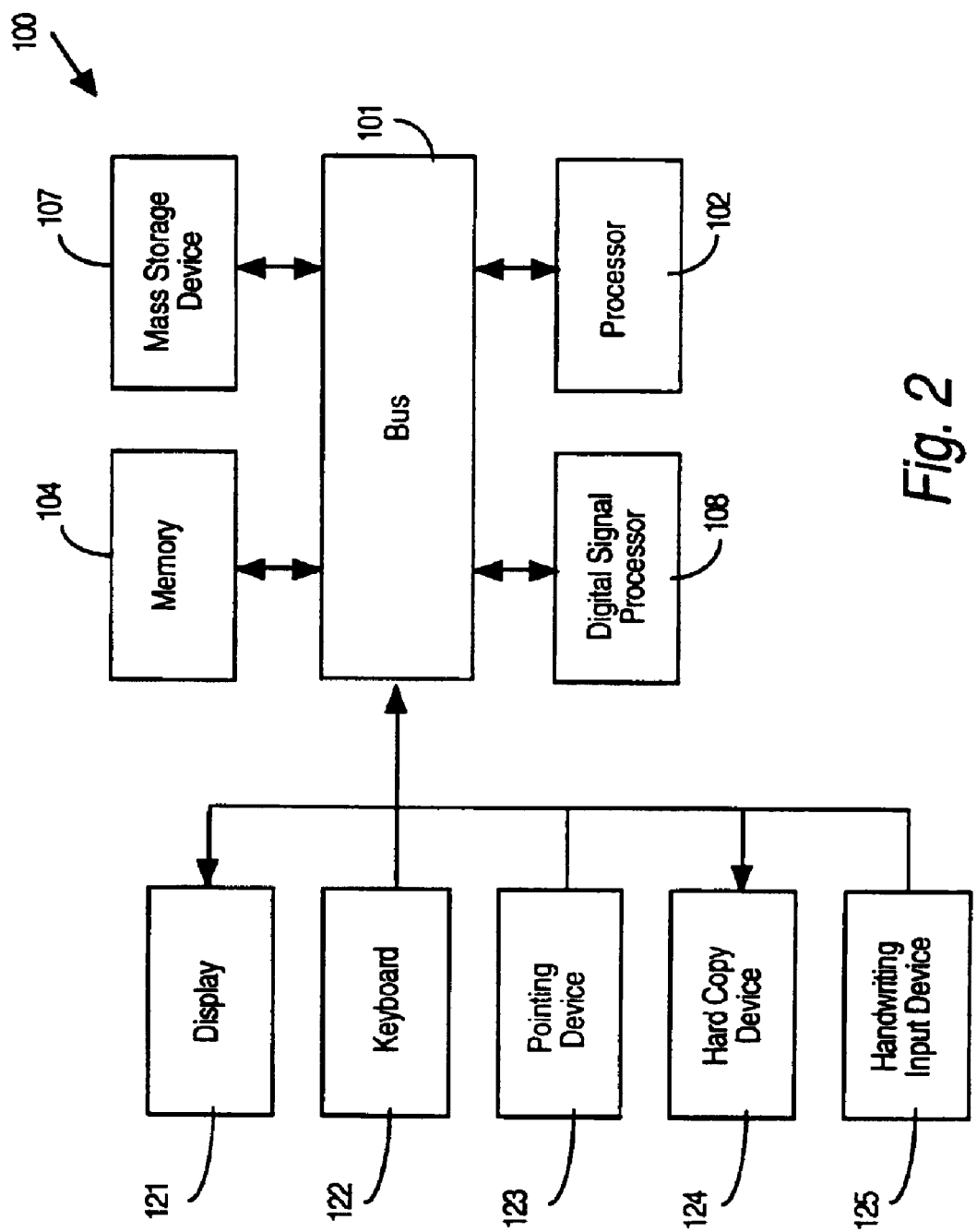
FIG. 2 shows a typical implementation of a general purpose computer system which may utilize the present invention and be an embodiment of the present invention.

FIG. 2A shows a typical example of a general purpose computer system according to the present invention which may implement and embody the present invention. The computer system 100 shown in FIG. 2 includes a bus 101 which is coupled to a processor 102. It will be appreciated the processor 102 may be a conventional microprocessor, such as a Power PC Microprocessor or other various microprocessors which are known in the art. This system may also include a digital signal processor 108 which may provide additional processing capabilities to process digital signals, such as speech or audio data or preprocess the handwritten input. This digital signal processor 108 is also coupled to the bus 101. A memory 104, such as DRAM, is coupled to the bus 101 and this memory functions as main dynamic memory while a mass storage device 107, such as a hard disk or other mass storage devices which are well known in the art is also coupled to the bus 101. Mass storage device 107 and/or memory 104 provide, in one embodiment, the computer readable storage medium which contain the computer programs and databases that implement the present invention. An expansion bus coupled to the bus 101 provides an interface to various input and output devices such as the display 121, the keyboard 122, the pointing device 123 (which may be a mouse or trackball), the hardcopy device 124 (which may be a printer) and the handwriting input device 125 which is a typical handwriting input tablet used to input cursive or printed handwritten characters. This handwriting input device 125 is typically a conventional pen and tablet device that translates pen motions generated by a user into a sequence of pen signals based upon periodic sampling of the pen's position on the tablet. Each pen signal corresponds to a coordinant pair (x,y) indicating the detected position of the pen. In the preferred embodiment, each pen signal signifies a coordinate pair and the pen signals are generated by sampling the pen location at periodic intervals. The output from the handwriting input device 125 allows the storage of each pen signal sequentially in a memory, such as memory 104, beginning at a predetermined location. In an alternative embodiment, the handwriting input device 125 may also provide the user with a display and function as a display device for system generated messages that provide the user with instructions or other information. Through the handwritten input device 125, a user provides the system 100 with commands and data, and the handwritten input provided by the user is recognized according to the handwriting recognition operations of the present invention. This handwriting recognition in one embodiment is considered on an on-line recognition procedure as the recognition occurs while the handwriting is being inputted.

Those skilled in the art will recognize that in an alternative embodiment, the present invention could function with an optical input means (e.g. a scanner) rather than a handwritten input device 125 in order to provide optical character recognition capabilities which may be considered an off-line handwriting recognition procedure. In this alternative approach, the strokes of the character would be extracted from the image representation and an on-line representation created.

Figure 3:
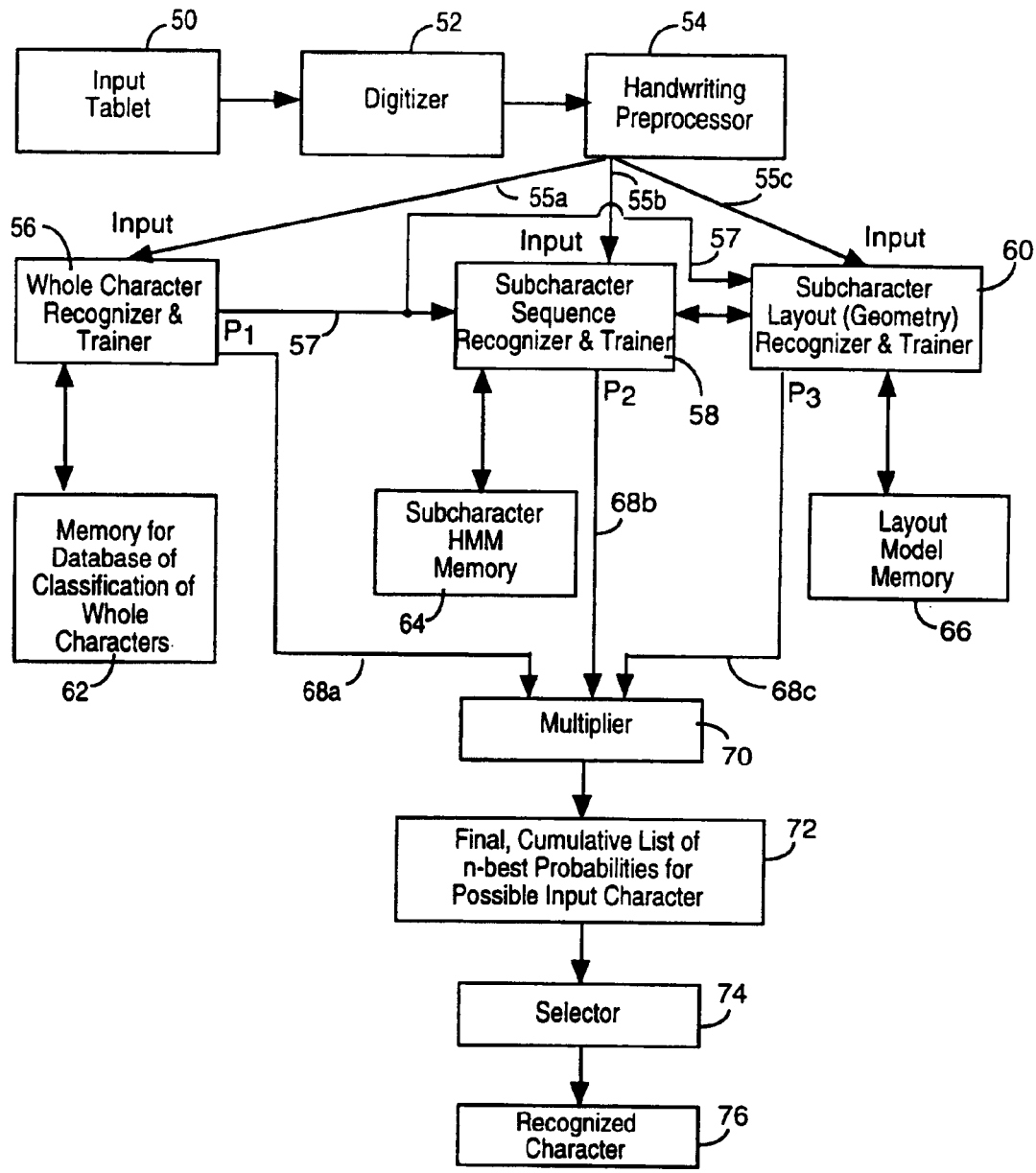
FIG. 3 shows an embodiment of the present invention, which may be considered to be a substantially hardware embodiment of the present invention.

FIG. 3 shows what may be considered to be a substantially hardware implementation of a system according to the present invention; however, FIG. 3 may also be considered to show the functional blocks implemented by a general purpose computer such as that as shown in FIG. 2. The system shown in FIG. 3 includes an input tablet 50 which is coupled to provide an output to a digitizer 52 which provides periodically sampled points which indicate the pen signals at the periodic intervals. The output from the digitizer 52 is coupled to a handwriting preprocessor 54 which preprocesses the points indicating the pen signals as sampled in the system. This handwriting preprocessor 54, in one embodiment, performs the operations shown in steps 350, 352, 354, and 356 of FIG. 11. The output from the preprocessor 54 is coupled to an input of the whole character recognizer and trainer 56 and to an input of the subcharacter sequence recognizer and trainer 58 and to an input of the subcharacter layout (geometry) recognizer and trainer 60. These inputs 55a, 55b and 55c provide each of these units with the necessary data to perform the functions described below for each of these units. In particular, the subcharacter sequence recognizer and trainer 58 receives the delta x and delta y values required for radical sequence recognition as described below. Similarly, the subcharacter layout recognizer and trainer 60 receives the geometric features, such as mean and variance (var) necessary for subcharacter layout recognition. The whole character recognizer and trainer 56 implements a conventional whole character preclassification in order to select the n best possible characters for further consideration by the subcharacter sequence recognizer and trainer 58 and the subcharacter layout (geometry) recognizer 60. The output from the whole character recognizer 56 is provided over the interconnect 57 to an input of the subcharacter sequence recognizer 58 and to an input of subcharacter layout (geometry) recognizer 60.

Each of the units 56, 58 and 60 are each coupled to a memory which may in fact be one memory having different portions addressed by the different units. The memory 62 contains a database of classification for the whole characters which is used to classify the whole characters in order to obtain the n best list of characters which are used for further consideration by the recognizer units 58 and 60. The subcharacter sequence recognizer and trainer 58 is coupled to the subcharacter HMM memory 64 in order to receive and store data related to the HMM recognition and training procedures. In particular, this memory stores the lexical tree representation of the subcharacter hidden Markov models which are used in the present invention to recognize time sequences of radicals. A layout model memory 66 is coupled to provide the layout training data which is used to recognize a subcharacter layout during the subcharacter layout recognition procedures described in the present invention. For each character described in the n best list of characters provided by the whole character recognizer 56, there are three probabilities, P1, P2, and P3 which are provided to the inputs 68a, 68b, and 68c to multiplier 70. These three probabilities are multiplied to provide a single probability for the particular character. This multiplication operation is performed for each such character in the n best list selected by the whole character recogizer 56 (a preclassifier) and this provides a final cumulative list 72 of the n best probabilities for the possible candidate characters. A selector 74 selects the highest probability which indicates the recognized character 76.

Figure 4:
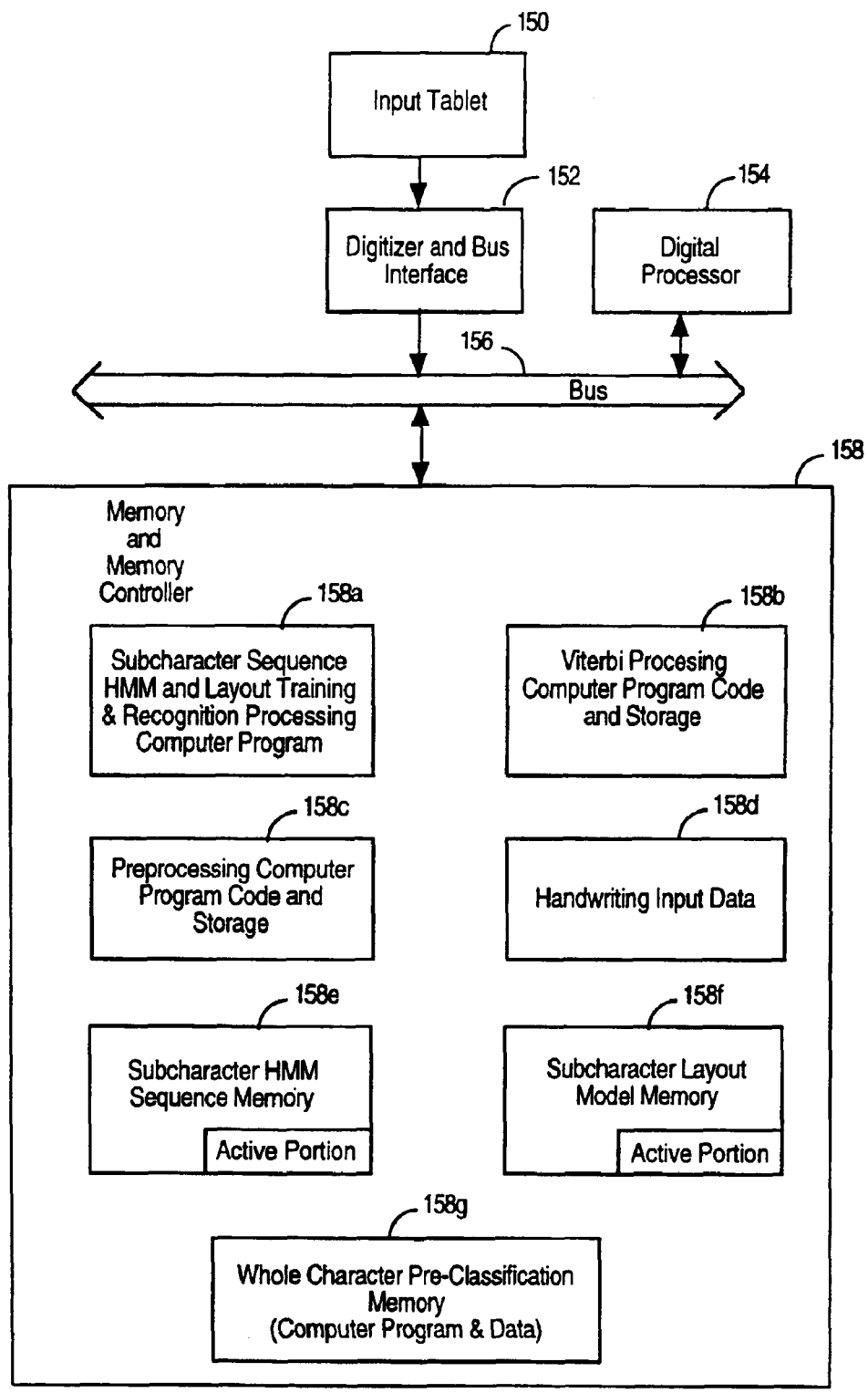
FIG. 4 shows an embodiment of the present invention and particularly shows certain components within the system of the present invention.

FIG. 4 illustrates another embodiment of the present invention which may be considered to be a printed circuit board mounted in an expansion slot (e.g. a PCI bus slot) of a computer system or it may be considered to be a general purpose computer system itself where the digital processor 154 is a main processing unit, such as a Power PC microprocessor in a Power PC system such as a Power Macintosh 8500/120. The system shown in FIG. 4 includes an input tablet 150 coupled to a digitizer and bus interface 152 which provides the input data through the bus 156 to the digital processor 154 and to the memory 158, which is assumed to include a memory controller. As shown in FIG. 4, various computer programs and data are stored in the memory 158. These computer programs and data include: the subcharacter sequence HMM and layout training and recognition processing computer program 158a; the Viterbi processing computer code and storage 158b; the preprocessing computer program code and storage 158c; a handwriting input data 158d obtained from the input tablet 150; the subcharacter HMM sequence memory 158e which includes an active portion which is designated by the preclassifier (this active portion contains the active characters designated by the preclassifier); subcharacter layout model memory 158f which also includes an active portion containing the geometric models for the active characters; and the whole character preclassification memory 158g which includes computer programs and data necessary for the preclassification methods.

A method for designing the radicals for use of the present invention will now be described while referring to FIG. 5. The method begins in step 200 by defining a set of subcharacters (radicals) for a particular language. Typically, there is a recognized definition or set of definitions for radicals for a particular language. That is, a dictionary or other reference source provides a list of recognized radicals which may be used according to the present invention. An example is the Koki dictionary for the Kanji characters. Two hundred fourteen radicals are defined in the Koki dictionary. Then in step 202, the method of the present invention analyzes the radical sequence of every character as written according to the official stoke order for the set of recognized radicals defined in step 200. For each recognized radical that is not completed before moving to another radical in the character, the method of the present invention separates the radicals into smaller radicals so that all radicals can be completed before moving to another radical. It will be appreciated that the official stroke order is the order in which the character should be written and is the recognized order for the particular recognized radical. Thus, step 202 takes one recognized radical and creates two newly defined radicals which will be used according to the present invention as described herein.

In step 204, the invention finds every radical that appears in more than one category. It is known that ideographic characters can be broken down into four basic constructs of radicals: vertical division, horizontal division, encapsulation and superimposition. A dictionary defined (regognized) radical can appear in one or more of these categories. According to the present invention, the method finds every radical that appears in more than one category and creates one newly defined radical per category.

Figure 5:
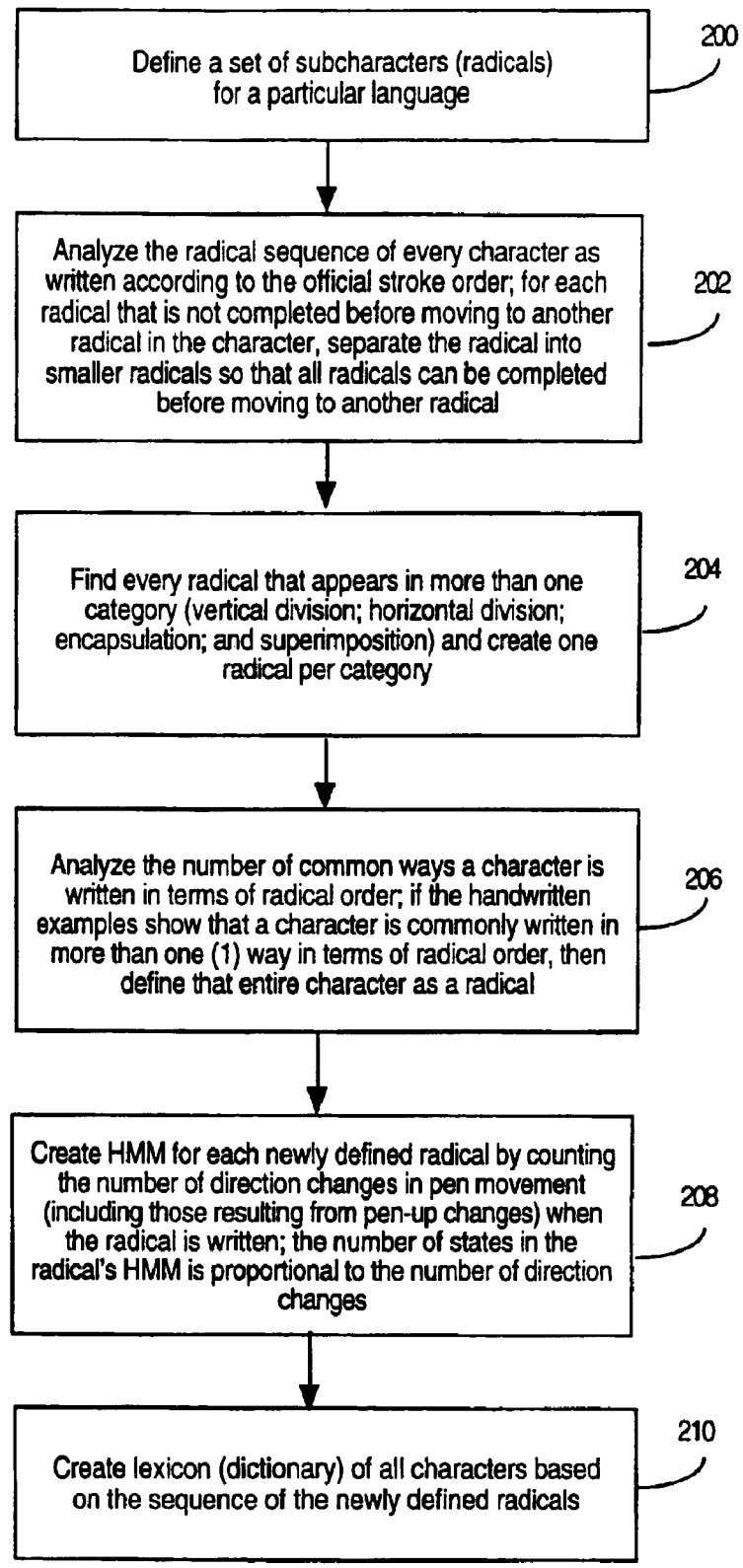
FIG. 5 illustrates a procedure for designing radical hidden Markov models according to the present invention.
Figure 6A:
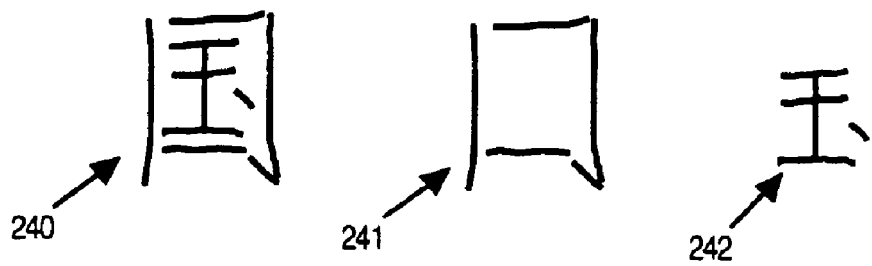
FIG. 6A illustrates a recognized definition of a character in terms of its radical constituents, thereby defining recognized radicals.
Figure 6B:
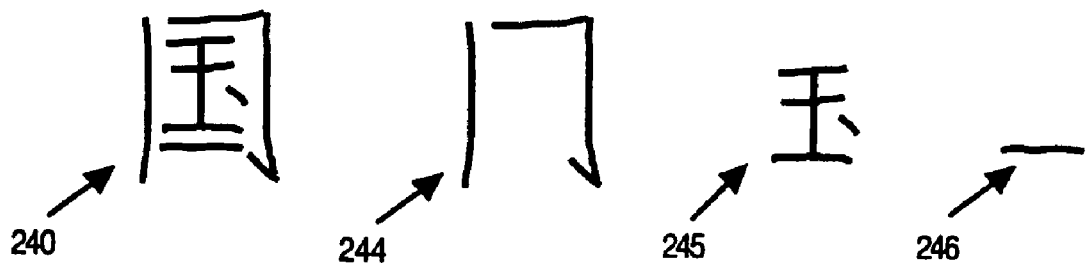
FIG. 6B shows a new radical dictionary definition of the same Chinese character of FIG. 6A according to the present invention.
Figure 7:
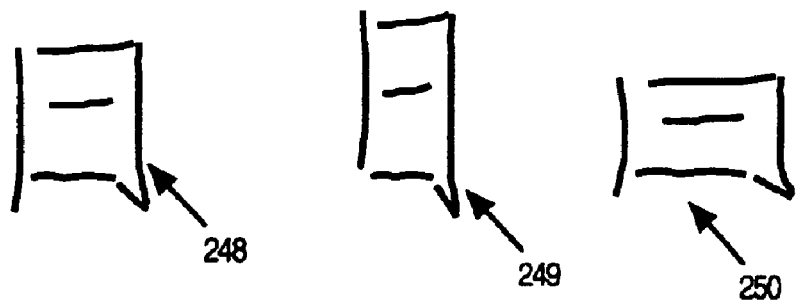
FIG. 7 shows the creation of three radicals according to the present invention from the recognized radical "Ri" because of shape changes.

FIGS. 6A, 6B and 7 will now be referred to in order to further describe steps 202 and 204. FIG. 6A shows a typical prior art definition of the radical 240 which is the character "Guo". According to the recognized radical dictionary definition of this character, there are two recognized radicals 241 and 242 for the character 240. Using step 202, the present invention breaks down the character 240 into three radicals rather than two radicals as shown in FIG. 6B. In particular, the radical 241 is separated into two radicals 244 and 246 as shown in FIG. 6B. This is because the radical 241 is initially begun and before it is completed the radical 242 is written and the bottom portion of the radical 241 is completed after completing the radical 242. Thus, by breaking the radical 241 into two radicals 244 and 246 as shown in FIG. 6B, the time sequence in the way these radicals are written (and in the way this character is written) is preserved in the radical definition of the present invention as shown in FIG. 6B. Thus, FIG. 6B shows that the new radicals have an order or sequence in time beginning from radical 244 to radical 245 and then lastly to radical 246. The HMM states for these 3 radicals will also be ordered in time in this manner. It will be appreciated that there are often several radicals per character and thus, several additional radicals may be created from one or more recognized radicals. FIG. 7 shows the implementation of step 204 of FIG. 5. In particular, FIG. 7 shows the creation of three radicals from the radical "Ri" because of shape changes. In particular, the category that the radical "Ri" appears in determines the shape of the radical. The radical 248 is a character as well as a radical while the radical 249 shows the radical when it is used in the vertical category (either off to the left or off to the right of an associated character or radical). In this position, the shape of this radical has changed. Radical 250 shows how the radical has changed in shape due to the fact that it is now in the horizontal category which means that it is either above or below another radical in a character. According to the present invention as indicated in step 204, this radical is separated into three radicals, two of which are newly defined and all three radicals will have a separate HMM.

Figure 8:
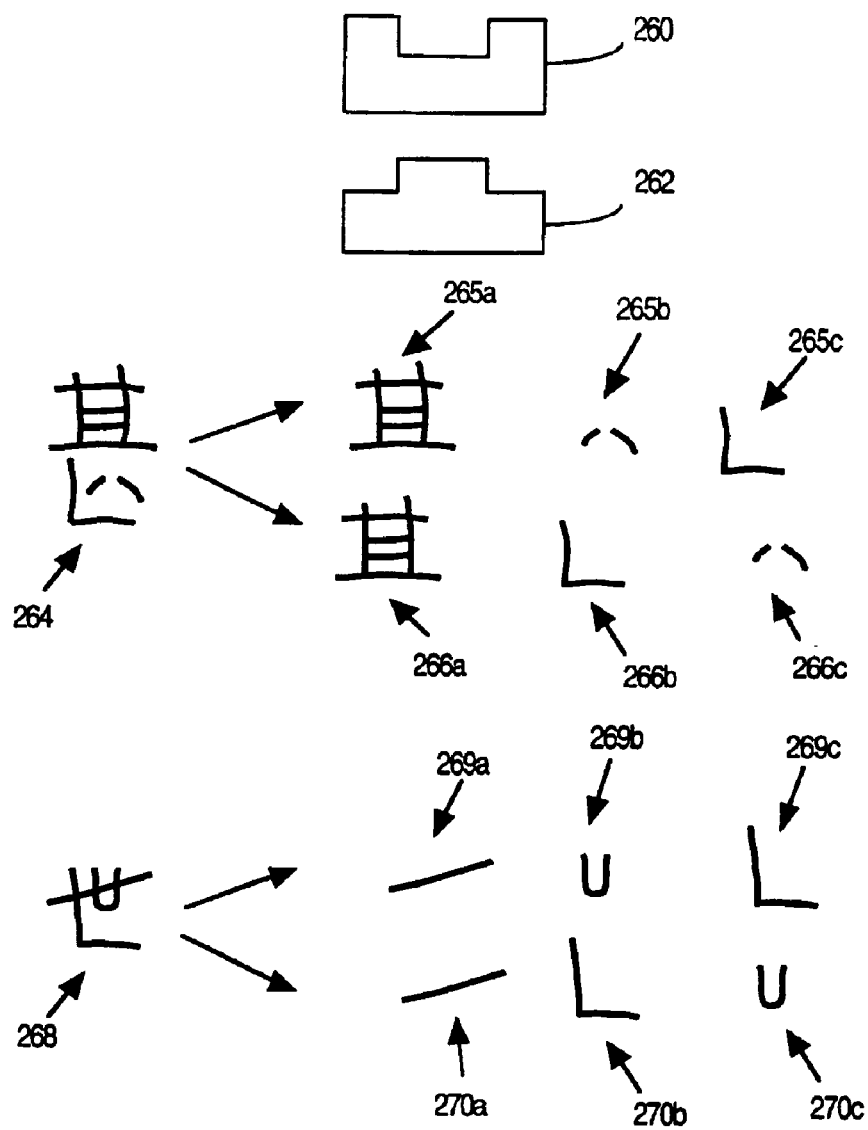
FIG. 8 illustrates various Chinese characters which are commonly written in more than one way in terms of radical order.

Referring back to FIG. 5, step 206 analyzes the number of common ways a character is written in terms of radical order. If the handwritten examples from various people show that a character is commonly written in more than one way in terms of radical order, then that particular entire character is defined as a radical. FIG. 8 shows various examples which fall into this category. For example, the characters 260 and 262 (which represent the English words concave and convex) can be written in numerous ways in terms of radical order and thus the character as a whole is treated as a radical. That is, character 260 is treated as a radical and character 262 is treated as a radical. Similarly, character 264 is treated as a radical since it often written in two different ways in terms of radical order, and character 268 is often written in two different ways in terms of radical order and thus character 268 is treated as a radical. Then in step 208, an HMM for each newly defined radical is created by counting the number of direction changes in pen movement, including those resulting from pen up changes, when the radical is written. The number of states in the radical's HMM is proportional to the number of direction changes. The hidden Markov model which is used is a left to right model. The HMM for a particular radical after considering the steps of FIG. 5 is constructed according to conventional techniques.

Figure 9:
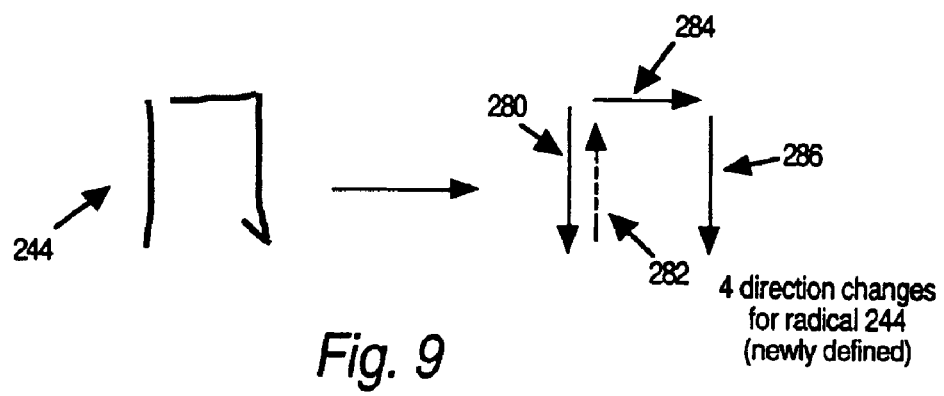
FIG. 9 illustrates the process of determining the number of direction changes for a newly defined radical according to the present invention in order to compute the number of states in the radical hidden Markov model for a particular radical.

FIG. 9 shows the method of counting direction changes for a particular radical, such as the radical 244. In this case it can be seen that there are four direction changes for newly defined radical 244. In particular the pen stroke 280 begins the radical and the pen lift stoke 282 (wherein the pen is not touching the pad or tablet) performs a second stroke and the strokes 284 and 286 complete the radical. It can be seen in this case that there are four direction changes. Similarly, the radical 245 shown in FIG. 6B has nine direction changes and the radical 246 shown in FIG. 6B has one direction change.

Figure 10:
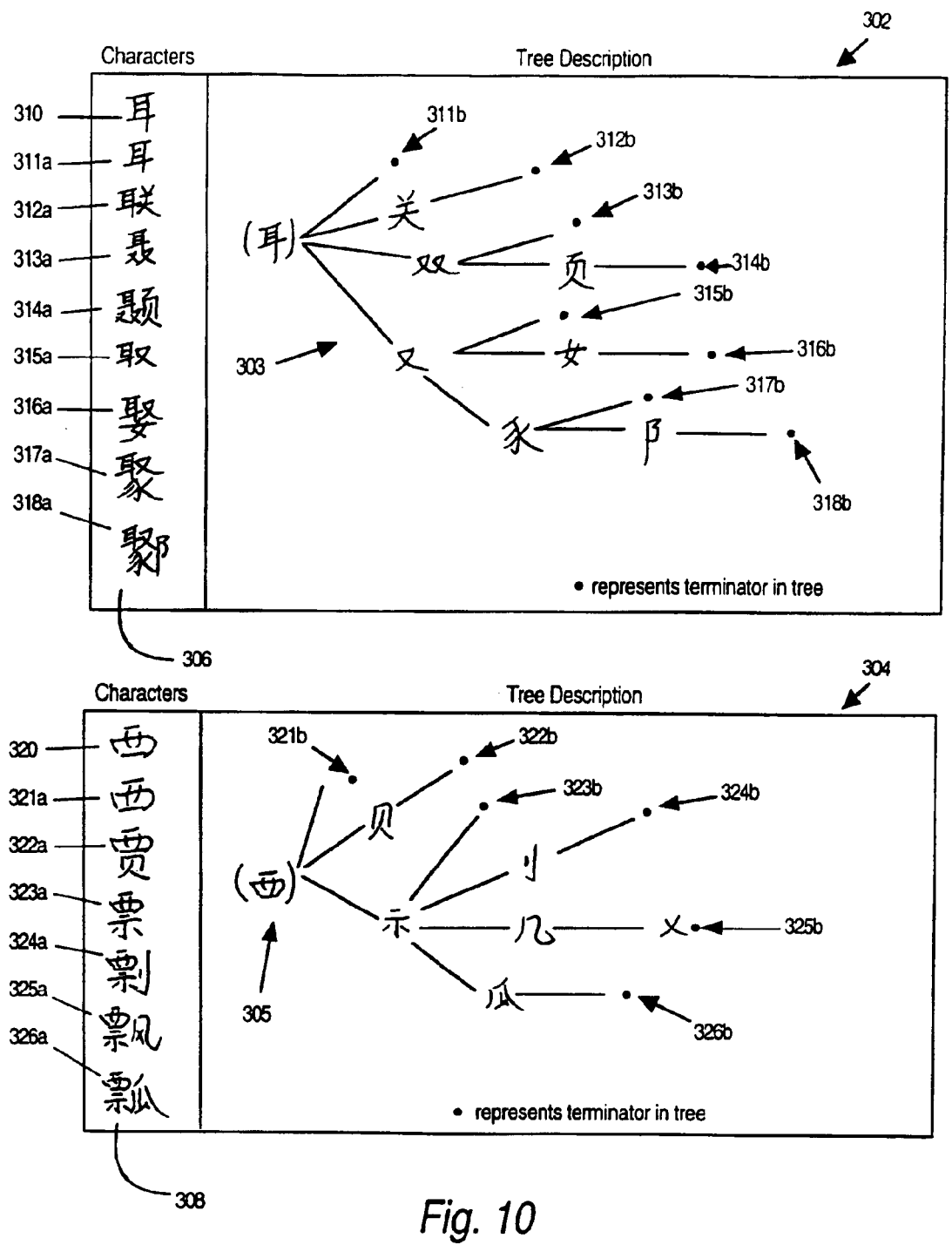
FIG. 10 shows two examples of portions of the lexical tree created from the dictionary according to present invention, where the tree description of the characters is at the radical level and is used to create the lexical tree of radical HMMs.

Then in step 210 of FIG. 5, a dictionary or a lexicon of all the characters based on a sequence of the newly defined radicals is formed. A lexical tree of the HMMs of the radicals is then created. FIG. 10 shows two examples of portions of the lexical tree created from the dictionary, where the tree description of the characters is at the radical level. These two examples are shown as 302 and 304 in FIG. 10. The characters 311a, 312a, 313a, 314a, 315a, 316a, 317a, and 318a form the character column 306 and are shown in the tree 303 by the corresponding terminator points 311b through 318b. Similarly the characters 321a through 326a are shown represented by the terminating points on the tree 305, where the terminating points are labeled as 321b through 326b of the tree 305. As will be described below in further detail, this lexical tree representation of the radical hidden Markov models for the present invention is used as a tree-based recognizer with the well known Viterbi algorithm to calculate the n best character sequences and hence, ultimately, the n best characters according to radical sequences.

Figure 11:
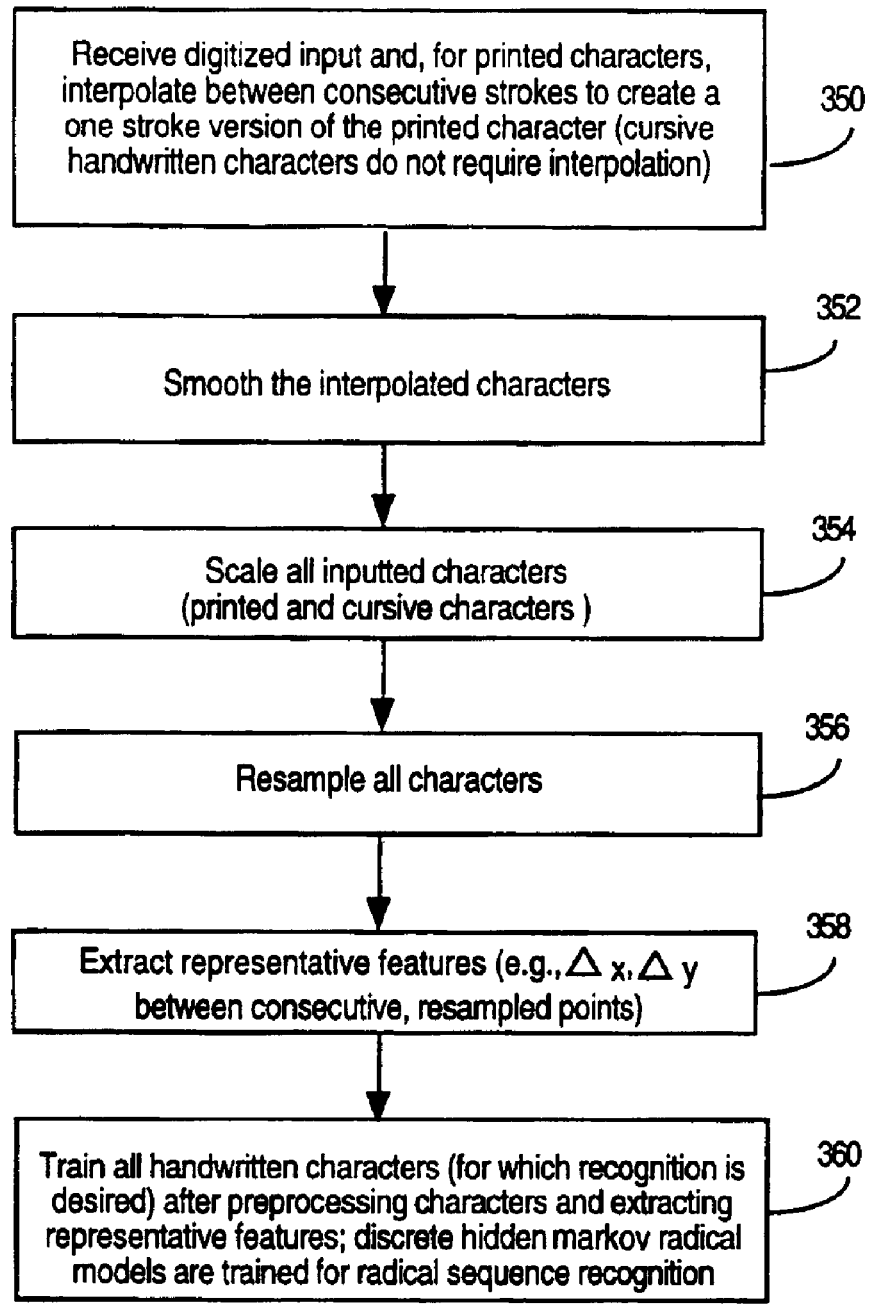
FIG. 11 shows a typical process according to the present invention for training the radical sequence HMMs.
Figure 12:
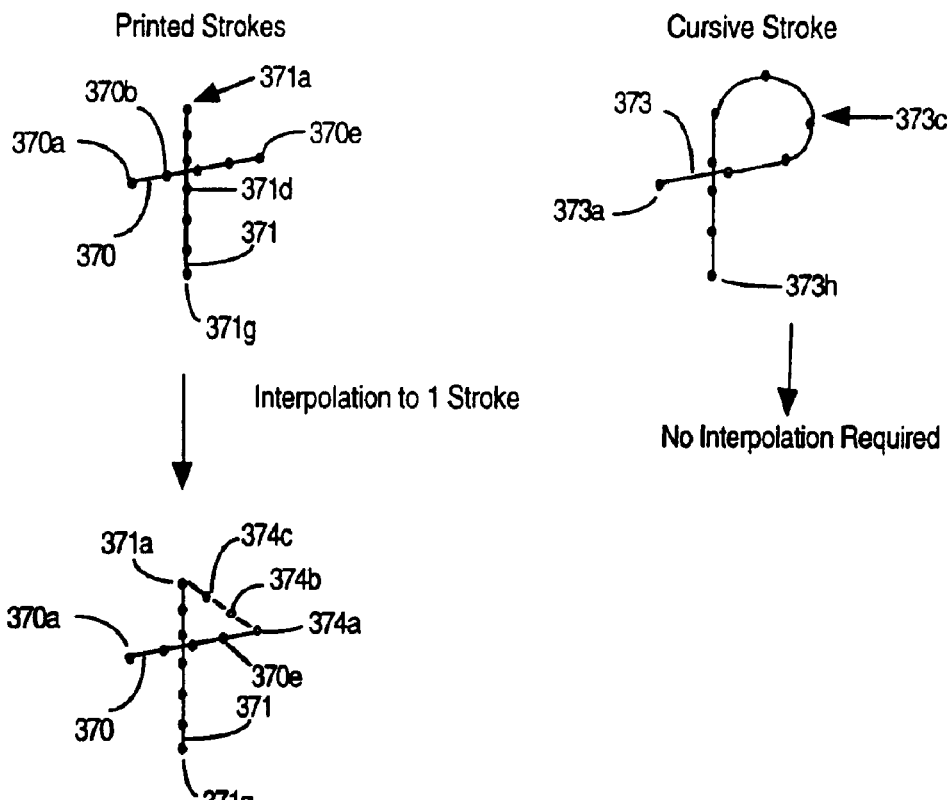
FIG. 12 shows an interpolation step according to the preprocessing portion of the present invention.
Figure 13:
FIG. 13 shows a smoothing step in order to perform preprocessing according to the present invention.

After defining the newly created radicals in creating the initial HMMs it is typically necessary to train the radical sequence HMMs as well as to train the geometry recognition system of the present invention. Radical sequence training is shown in the flowchart of FIG. 11. FIG. 11 includes four steps which are practiced according to one embodiment of invention in order to preprocess characters. These steps, 350, 352, 354, and 356 are employed to try to reduce the variance between print and cursive examples of a handwritten character and to convert print styles into one stroke styles. In step 350, the digitized input is received and, for printed characters, there is an interpolation of the points between the consecutive strokes to create a one stroke version of the printed character. Of course, one-stroke handwritten characters do not require interpolation. As shown in FIG. 12 the stroke 373 is one-stroke and includes various points, but no interpolation is required. On the other hand, the printed strokes 370 and 371 produce various points but the strokes are not interconnected into one stroke. According to the present invention the two strokes are interpolated between by providing interpolated points between consecutive strokes, such as interpolated 374a, 374b, and 374c as shown in FIG. 12. It is noted that even "cursive" writing may form a character with multiple strokes, and this writing will be converted into a single-stroke representation. The number of points added for connecting consecutive strokes is based on the average speed with which the previous stroke is written and the distance between consecutive strokes. The first connection point (e.g. point 374a) is calculated by finding the average direction and speed of the last few points (e.g. 3 points) of the previous stroke to be connected and linearly interpolating based on these values. The number and position of the remaining connecting points, such as points 374b and 374c are based on the same speed value and by linearly interpolating between the first connecting point and the first point in the next stroke.

Next in step 352, the interpolated character is smoothed using a simple triangular filter using conventional techniques well known in the art. Next in step 354, the character (whether printed or cursive) is scaled to be of standard size. This is done by normalizing the variance of the character. Finally, in step 356, all of the characters are resampled in order to reduce variation between examples of a character written quickly and examples of a character written slowly. This also makes the resampled representation hardware sampling rate independent such that faster sampling by faster hardware will not produce a substantially different number of points then slower hardware sampling. Also, the resampling reduces the number of sampling points for faster processing. The average speed with which a character is written is calculated by finding the total distance(e.g. Euclidean distance) traveled by the pen divided by the number of sample points. The character is then resampled so that the average speed of the character is changed to a predetermined fast speed. Time based resampling is used to maintain all acceleration and de-acceleration information of the pen. If the average speed before resampling was 20, (derived from, for example, dividing a distance of 200 by 10 points) then a resampled character resampled at a predefined fast speed of 40 will take every other point on the character. This is derived from noting that a predetermined fast speed of 40 with a distance of 200 can be achieved by 5 points. Thus, in one embodiment the predetermined fast speed is divided by the average speed to provide a ratio value and this ratio value is then used to determine how many points to remove from the resampled character; if there is a fraction produced by this ratio, then an interpolation is performed to provide the new number of points on the resampled character.

Figure 14:
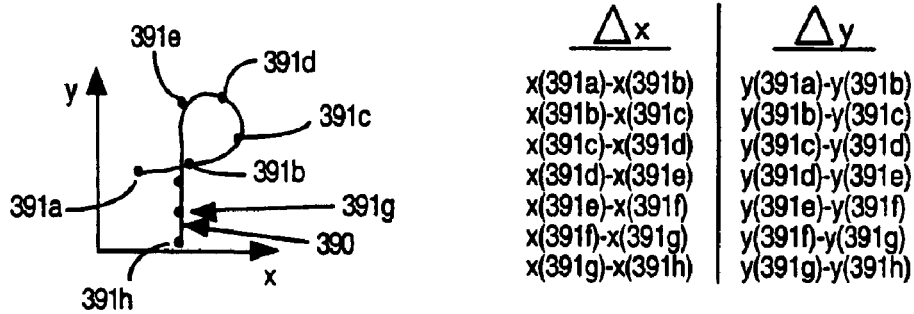
FIG. 14 illustrates an extraction of the parameters necessary for radical sequence recognition according the present invention.

After resampling all characters, the present invention in step 358 extracts the representative features(e.g. delta x and delta y between consecutive, resampled points) for a particular radical and these extracted features are then used to train the handwritten characters for which recognition is desired. The discrete hidden Markov radical models are trained for radical sequence recognition in step 360 using standard procedures; see, for example, L. E. Baum, "Inequality and Associated Maximization Technique In Statistical Estimation of Probabilistic Functions of Markov processes", Inequalities, vol. 3, pp. 1–8 (1972); Also see K. Lee "Automatic Speech Recognition: The development of The SPHINX System", Kluwer, Boston (1989). Thus, all handwritten characters are trained after performing preprocessing for the characters and extracting representative features. The extraction of representative features is shown further detail in FIG. 14.

The radical sequence recognition procedures of the present invention according to one embodiment will now be described while referring to FIG. 15. This method begins in step 400 in which the digitized input is received. If the digitized input are printed characters, (indicated by pen lifts while tracing the character) the interpolation step between consecutive strokes is performed to create a one stroke version as described above. Then a smoothing operation is performed on the interpolated characters in step 402. Next, a scaling operation of all inputted characters is performed in step 404. Then, resampling of all characters occurs in step 406 as described above. Next in step 408, the representative features are extracted which, according to one embodiment of the invention, uses the delta x and delta y values between consecutive, resampled points Then in step 410, the actual radical sequence recognition procedure occurs by using the Viterbi algorithm to search the lexical tree representation of the radical HMMs. In a preferred embodiment of the present invention, the subcharacter sequence recognition is dictionary-driven using a lexical tree representation of the subcharacter hidden Markov models, and only those subcharacter contained in the active dictionary are evaluated. The n most probable characters selected by the preclassification method described above are the characters in the active dictionary. The tree based recognizer, using conventional techniques, calculates the n best subcharacter sequences by determining the n best probabilities for the n best candidate characters based on the radical sequence recognition. This provides the list indicated in step 412. Then in step 414, the results of the radical sequence recognition are combined with the results from the geometric layout recognition and the results from the preclassification recognition by multiplying the three different probabilities for each candidate character in the active dictionary to provide a final probability for the candidate character. Then the candidate character with the highest final probability is selected as the recognized character. The geometric layout recognition is described in detail below, particularly in conjunction with FIGS. 18 and 19.

Figure 17A:
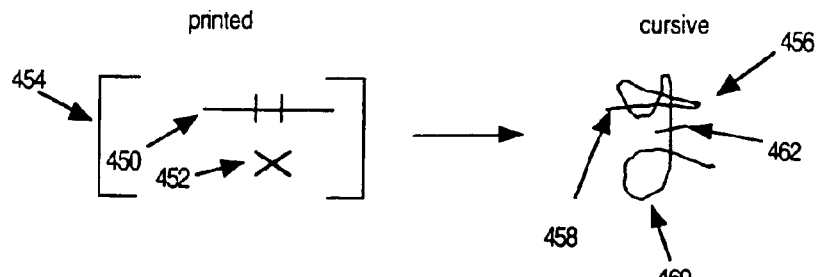
FIG. 17A illustrates a segmentation of a cursive handwritten character.
Figure 17B:
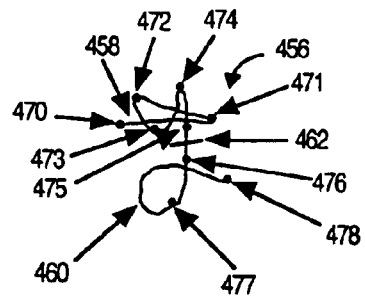
FIG. 17B illustrates the HMMs for two radicals and illustrates the segmentation between those two radicals according to the present invention.
Figure 17B:
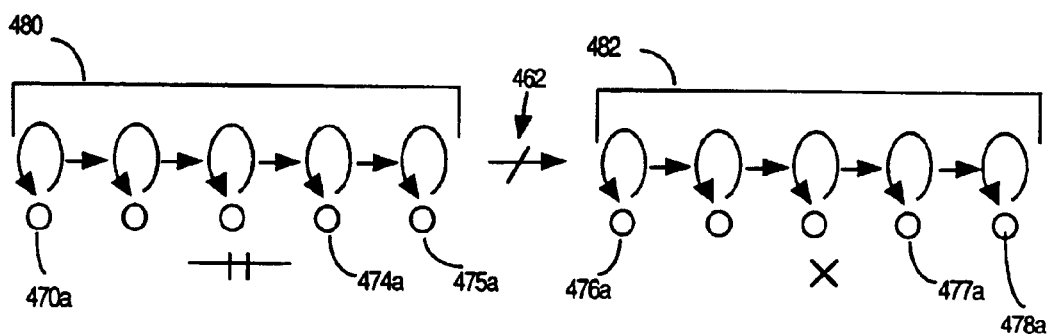

FIG. 16 illustrates a geometric layout training procedure according to one embodiment of the present invention. In step 425, n handwritten examples are obtained for each radical in a particular character. These examples are digitized and preprocessed using the techniques described above, including interpolation, smoothing, scaling, and resampling. The Viterbi algorithm using the radical HMMs of the invention achieves segmentation automatically into the radicals because the Viterbi algorithm records the alignment of the process data points to the hidden Markov model states so that the processed character can be segmented into a sequence of subcharacters. That is, segmentation of a character into its subcharacter components is performed during the subcharacter sequence recognition which occurs while geometric layout training occurs. This is shown in further detail in FIGS. 17A and 17B. In particular, the printed character 454 which includes radicals 450 and 452 is converted into the cursive character 456 which is separated at the point 462 into the two radicals 458 and 460. As shown in FIG. 17B, certain of the points on the two radicals are aligned to the model states in the HMMs 480 and 482. In particular, processed data point 470 is aligned to the hidden Markov model state 470$a$ while the processed data point 475 (which represents the last data point along the time sequence of the radical 458) is aligned with the hidden Markov state 475$a$ in the hidden Markov model 480 for the radical 458. Similarly, the point 476 on the radical 460 is aligned with the hidden Markov model state 476$a$, and the Vertibi algorithm maintains the alignment of the process data points to the model states so that the process character can be segmented into a sequence of subcharacters in order for the geometric layout training (and recognition) procedure to work.

Figure 17C:
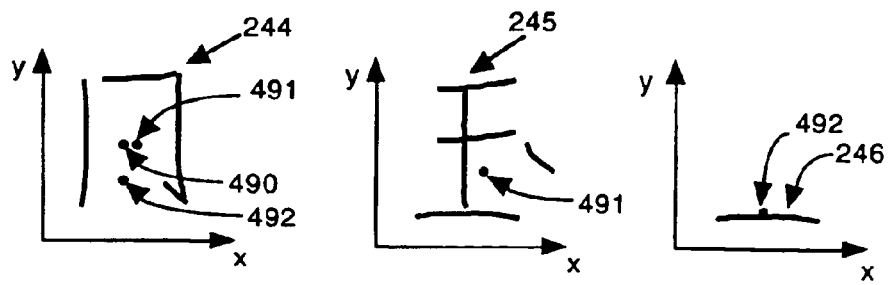
FIG. 17C shows the various measurements which take place in both training and recognition of geometric features of a radical in character recognition according to the present invention.
Figure 19:
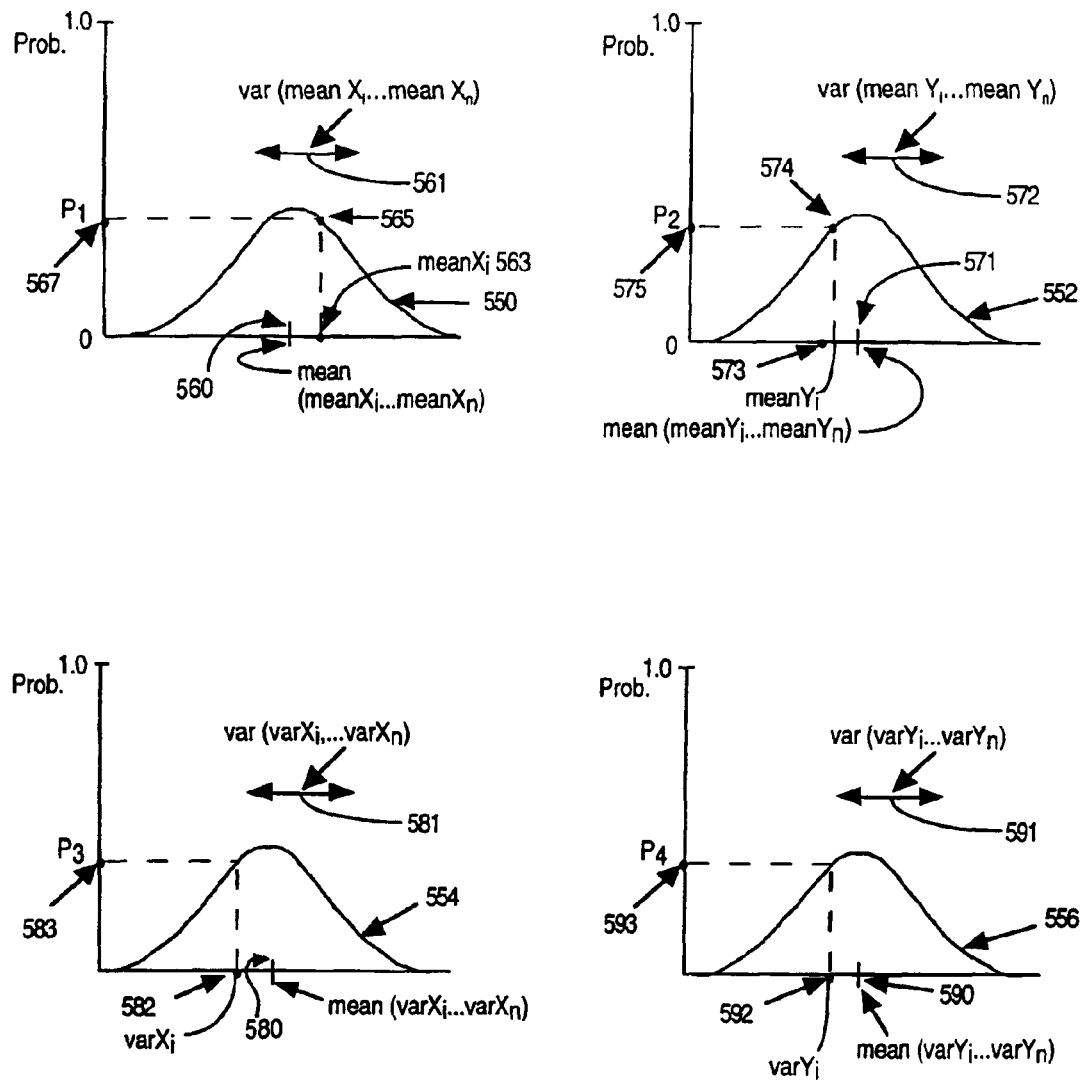
FIG. 19 illustrates the mapping of extracted geometric features from a particular radical to four probability distributions for a particular trained radical in order to perform geometrical layout recognition according to the present invention.

Referring again back to FIG. 16, in step 427, four values are computed for each example of the radical in the character. These values are the mean of x (mean xi), the mean of y (mean yi), the variance of x (var xi), and variance of y (var yi). These four values for each radical may then be used to determine the statistics for the n handwritten examples of the radical and these statistics are stored as indicated in step 429. In particular, step 429 indicates the eight different values which are determined and stored from n handwritten examples, each of which has the four values as calculated as indicated in step 427. Step 429 provides four gaussian distributions which are stored and which describe the radical in the particular character. Examples of these four radical gaussian distributions are shown in FIG. 19. Then in step 431, steps 425, 427, and 429 are repeated for the next radical for the particular character. This continues until all radicals for the particular character are processed. Then in step 433, the next character is taken up and processed according to steps 425, 427, 429 and 431. This will produce a group of four gaussian distributions as shown in FIG. 19 for each radical in each character which is used to form the geometric model for each radical which is then used in the geometric layout recognition procedure described in conjunction with FIG. 18. FIG. 17C shows a method for measuring the center of the various radicals; each of the radicals within a character is measured relative to the same coordinate system such that the center of each radical is properly aligned in relationship to the other centers as shown in FIG. 17C.

FIG. 18 illustrates a method of geometric layout recognition according to the present invention. This method begins in step 500 in which the input character is preprocessed as indicated in step 500 and as described above. Next, in step 502, the sequence features which are necessary for segmentation as described above are extracted. Then in step 504, the Vertibi search through the radical sequence HMMs is performed; as described above, this search is limited in one embodiment to the characters selected by the preclassifier such that only active characters are searched. Then the character is segmented into radicals in step 506 as described above, and in step 508, the geometric features for each inputted radical are extracted. In step 510 these extracted geometric features are used to map to the four gaussian distributions of each radical of the active characters in the dictionary to produce four probabilities for each radical in the active dictionary. This is shown in further detail in FIG. 19 in which the four extracted geometric features 563, 573, 582, and 592 are used to obtain four probabilities, P1, P2, P3 and P4 from the four gaussian probability distributions 550, 552, 554 and 556 respectively. Then in step 512, the four probabilities are multiplied together for each radical in the active dictionary to obtain one geometric layout probability value for each such radical in a character. Then in step 514, the average probability for all radicals in the character is calculated and this average probability is also calculated for all the characters in the active dictionary by performing steps 508, 510, and 512 and the average calculation step of 514 for each radical in all other characters in the active dictionary. Then in step 516 the n best set of characters having the highest probabilities is selected by ranking the candidate characters in the active dictionary into the n best list based on this layout recognition process. Then as indicated in step 414 of FIG. 15, the probability result for each character of the n best list of candidate character from the layout recognition procedure is combined with the corresponding probabilities for that character from the preclassification procedure and the radical sequence recognition procedure in order to obtain a final probability for the candidate character as well as final probability values for all other candidate characters. Then, the candidate character having the highest probability is selected as the recognized character as indicated in step 414.

Numerous alternative embodiments of the invention will be understood by those skilled in the art after referring to the present invention. For example, various aspects of the invention may be practiced without using a preclassifier or a preclassification process. Also, another embodiment may not create separate, newly defined radicals from a radical which appears in more than one category (e.g. horizontal and vertical categories). In the foregoing specification, the invention has been described with reference to specific embodiments thereof. It will be, however evident that various modifications and changes may be made thereto without departing from the broader scope and spirit of the invention. The specification and drawings are, accordingly, to be regarded in an illustrative rather than an restrictive sense.

We claim:

1. A method of recognizing a handwritten character comprising:
   comparing a handwritten input to a first model of a first portion of said character;
   comparing said handwritten input to a second model of a second portion of said character, said second portion of said character having been defined to follow in time said first portion, wherein said first portion is a first radical and said second portion is a second radical, and wherein said first model is a first hidden Markov model and said second model is a second hidden Markov model, and wherein said second model is defined to follow said first model in time.

2. A method as in claim 1, wherein said handwritten character is a cursively written character and wherein said method is on an on-line method of recognizing a handwritten character.

3. A method as in claim 1, wherein said handwritten character is a printed character.

4. A method as in claim 3 wherein said handwritten character is preprocessed to provide a cursively written representation and said handwritten input is said cursively written representation.

5. A method as in claim 1, further comprising:
   comparing a first geometric feature of said first portion to a first geometric model of said first portion;
   comparing a second geometric feature of said second portion to said first geometric model.

6. A method as in claim 5 further comprising:
   comparing said first geometric feature of said first portion to a second geometric model of said second portion;
   comparing said second geometric feature of said second portion to said second geometric model.

7. A method as in claim 6 wherein said first geometric feature comprises a mean for a center of said first portion of said handwritten character and wherein said first geometric model comprises a mean for a plurality of centers of a plurality of examples of said first portion.

8. A method as in claim 1 wherein said first portion comprises a first portion of a recognized radical and said second portion comprises a second portion of said recognized radical, wherein said first portion is normally written first and then at least another portion of another recognized radical is written and then said second portion is written.

9. A method as in claim 1 wherein said character comprises a first recognized radical and a second recognized radical and wherein said method recognizes said character by using said first model for both said first recognized radical and said second recognized radical and wherein said first portion comprises said first recognized radical and said second recognized radical, and wherein said second recognized radical is normally written either before or after said first recognized radical.

10. A method for recognizing a handwritten character comprising:
    comparing a first geometric feature of a first portion of a character to a first geometric model of said first portion;
    comparing a second geometric feature of a second portion of said character to said first geometric model of said first portion, wherein said first portion and said second portion are first and second radicals of said character, and wherein said first geometric feature comprises a mean for a center of said first portion of said handwritten character and wherein said first geometric model comprises a mean for a plurality of centers of a plurality of examples of said first portion.

11. A method for recognizing a handwritten character comprising:
    comparing a first geometric feature of a first portion of a handwritten character to a first geometric model of said first portion;
    comparing a second geometric feature of a second portion of said handwritten character to said first geometric model of said first portion, wherein said first portion and said second portion are first and second radicals of said handwritten character; and
    segmenting said handwritten character by using a Viterbi search through a lexical tree of hidden Markov models, comprising first and second models of said first and second radicals.

12. A method as in claim 11, wherein said first and second models have been defined to follow in a specific time sequence.

13. A method of creating a database of radicals for use in handwriting recognition of a handwritten character, said method comprising:
    storing a first model in a computer readable storage medium for a first portion of said character;

storing a second model in said computer readable storage medium for a second portion of said character, wherein said first portion comprises a first portion of a recognized radical and said second portion comprises a second portion of said recognized radical, wherein said first portion is normally written first and then at least another portion of another recognized radical is written and then said second portion is written, wherein said first model is a first hidden Markov model for said first portion and said second model is a second hidden Markov model for said second portion and wherein said first model is defined to follow in time said second model.

14. A method of creating a database of radicals for use in handwriting recognition, said method comprising:

storing a first model in a computer readable storage medium for a first recognized radical;

storing a second model in said computer readable storage medium for said first recognized radical, said first recognized radical having different shapes depending on the use of said first recognized radical in a character, wherein said first model is a first hidden Markov model and said second model is a second hidden Markov model.

15. A method of creating a database of radicals for use in handwriting recognition of a handwritten character, said method comprising:

storing a first hidden Markov model in a computer readable storage medium for a first portion of said character;

storing a second hidden Markov model in said computer readable storage medium for a second portion of said character, wherein said second hidden Markov model having been defined as following in time said first hidden Markov model, wherein said character comprises a first recognized radical and a second recognized radical and wherein said method recognizes said character by using said first model for both said first recognized radical and said second recognized radical and wherein said first portion comprises said first recognized radical and said second recognized radical, and wherein said second recognized radical is normally written either before or after said first recognized radical.

16. A method as in claim 15 further comprising:

storing a first geometric model of said first portion;

storing a second geometric model of said second portion.

17. A method as in claim 15 wherein said first portion comprises a first portion of a recognized radical and said second portion comprises a second portion of said recognized radical, wherein said first portion is normally written first and at least another portion of another recognized radical is written and then said second portion is written.

18. A digital processing system comprising:

an input table for inputting handwritten characters;

a bus coupled to said input tablet;

a processor coupled to said bus;

a memory coupled to said bus, said memory storing a first model of a first portion of a character desired to be recognized, and storing a second model of a second portion of said character, said memory storing said second model such that said second model is defined to follow in time said first model, wherein said first portion is a first radical and said second portion is a second radical, and wherein said first model is a first hidden Markov model and said second model is a second hidden Markov model.

19. A system as in claim 18 wherein said processor recognizes an inputted handwritten character by comparing a representation of said inputted handwritten character to said first model and then to said second model.

20. A system as in claim 19 wherein said representation is a preprocessed representation such that if said inputted handwritten character is a printed character, said preprocessed representation provides a one-stroke written representation of said printed characters.

21. A system as in claim 19 wherein said system comprises a printed circuit housing which is adapted to connect to a computer system through an expansion connection of said computer system.

22. A system as in claim 21 wherein said bus and said processor are positioned on said printed circuit housing.

23. A system as in claim 19 wherein said system is part of a computer system and said bus is a system bus and said processor is a central processing unit of said computer system.

24. A system as in claim 19 wherein said memory further stores a first geometric model of said first portion and stores a second geometric model of said second portion.

25. A system as in claim 24 wherein said processor further recognizes said inputted handwritten character by comparing a first geometric feature of said first portion to said first geometric model and by comparing a second geometric feature of said second portion to said first geometric model.

26. A system as in claim 25 wherein said processor performs a Viterbi search through a lexical tree of plurality of hidden Markov models stored in said memory, said plurality of hidden Markov models comprising said first hidden Markov model and said second hidden Markov model.

27. A digital processing system as in claim 18 wherein said first portion comprises a first portion of a recognized radical and said second portion comprises a second portion of said recognized radical, wherein said first portion is normally written first in time and then at least another portion of another recognized radical is written and then said second portion is written.

28. A digital processing system comprising:

an input for inputting handwritten characters;

a bus coupled to said input;

a processor coupled to said bus;

a memory coupled to said bus, said memory storing a first model for a first recognized radical and storing a second model for said first recognized radical, said first recognized radical having different shapes depending on the use of said first recognized radical in a character, wherein said first model is a first hidden Markov model and said second model is a second hidden Markov model.

29. A digital processing system as in claim 18 wherein said memory stores preclassification data and instructions for selecting n best characters from a larger number of characters.

30. A digital processing system as in claim 25 wherein said memory stores preclassification data and instructions for selecting n best characters from a larger number of characters.

31. A computer readable storage medium containing executable computer program instructions which when executed by a digital processing system cause the system to perform the steps of:

comparing a first geometric feature of a first portion of a character to a first geometric model of said first portion;

comparing a second geometric feature of a second portion of said character to said first geometric model of said first portion, wherein said first portion and said second portion are first and second radicals of said character and wherein said medium contains executable instructions which when executed cause the system to perform the step of segmenting said character by using a search through a group of hidden Markov models comprising first and second models of said first and second radicals.

32. A computer readable storage medium as in claim 31, wherein said second model has been defined to follow said first model in time.

33. A computer readable storage medium as in claim 31 wherein said medium contains executable instructions which when executed cause the system to perform the step of preclassifying n best characters by selecting the n best characters from a larger number of characters.

34. A computer readable storage medium containing executable computer program instructions which when executed by a digital processing system cause the system to perform the steps of:

comparing a handwritten input to a first model of a first portion of a character;

comparing said handwritten input to a second model of a second portion of said character, said second portion of said character having been defined to follow in time said first portion, wherein said first portion is a first radical and said second portion is a second radical, said first model is first hidden Markov model and said second model is a second hidden Markov model, and wherein said second model is defined to follow said first model in time.

35. A computer readable storage medium as in claim 34 wherein said medium contains instructions which when executed cause the system to perform the steps of:

comparing a first geometric feature of said first portion to a first geometric model of said first portion;

comparing a second geometric feature of said second portion to said first geometric model.

36. A computer readable storage medium as in claim 34 wherein said character comprises a first recognized radical and a second recognized radical and wherein said character is recognized by using said first model for both said first recognized radical and second recognized radical and wherein said first portion comprises said first recognized radical and said second recognized radical, and wherein said second recognized radical is normally written either before or after said first recognized radical.

37. A computer readable storage medium as in claim 34 wherein said medium contains instructions which when executed cause the system to perform the step of preclassifying n best characters by selecting the n best characters from a larger number of characters.

38. An apparatus for recognizing a handwritten character comprising:

means for comparing a handwritten input to a first model of a first portion of said character; and means for comparing said handwritten input to a second model of a second portion of said character said second portion of said character having been defined to follow in time said first portion, wherein said first portion is a first radical and said second portion is a second radical, and wherein said first model is a first hidden Markov model and said second model is a second hidden Markov model, and wherein said second model is defined to follow said first model in time.

39. An apparatus as in claim 38 comprising:

means for comparing a first geometric feature of said first portion to a first geometric model of said first portion;

means for comparing a second geometric feature of said second portion to said first geometric model.

* * * * *